(12) United States Patent
Farr et al.

(10) Patent No.: US 10,432,309 B2
(45) Date of Patent: Oct. 1, 2019

(54) OPTICAL COMMUNICATIONS SYSTEMS

(71) Applicant: California Institute of Technology, Pasadena, CA (US)

(72) Inventors: William H. Farr, Monrovia, CA (US); Meera Srinivasan, La Crescenta, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/211,557

(22) Filed: Dec. 6, 2018

(65) Prior Publication Data

US 2019/0115979 A1    Apr. 18, 2019

Related U.S. Application Data

(62) Division of application No. 15/422,363, filed on Feb. 1, 2017, now Pat. No. 10,193,628.

(60) Provisional application No. 62/319,491, filed on Apr. 7, 2016, provisional application No. 62/300,240, filed on Feb. 26, 2016, provisional application No. 62/289,608, filed on Feb. 1, 2016.

(51) Int. Cl.
*H04B 10/54* (2013.01)
*H04B 10/118* (2013.01)

(52) U.S. Cl.
CPC ......... *H04B 10/118* (2013.01); *H04B 10/54* (2013.01)

(58) Field of Classification Search
CPC .. H04B 10/118; H04B 10/54; H04B 10/1121; H04B 7/185; H04B 10/22; F41G 7/2206; H04J 14/02
See application file for complete search history.

(56) References Cited

U.S. PATENT DOCUMENTS

| 2005/0012033 A1* | 1/2005 | Stern | G01T 1/2928 250/214 R |
|---|---|---|---|
| 2008/0290259 A1 | 11/2008 | Mathewson et al. | |
| 2014/0293102 A1* | 10/2014 | Vogelsang | H04N 5/3535 348/294 |
| 2015/0037047 A1 | 2/2015 | Barnett et al. | |

OTHER PUBLICATIONS

Farr, W., et al., "Overview and design of the DOT flight laser transceiver,", JPL Interplanetary Network Progress Report, 42-185, May 15, 2011, pp. 1-31.
Quirk, K.J., et al., "Optical ppm synchronization for photon counting receivers", IEEE Military Communications Conference, MILCOM, Nov. 2008, pp. 1-7.
Farr, W., et al., "Deep space acquisition and tracking with single photon detector arrays", 2011 International Conference on Space Optical Systems and Applications (ICSOS), May 2011, pp. 117-121.
Cova, S., et al., "Avalanche photodiodes and quenching circuits for single-photon detection," Applied Optics, Apr. 20, 1996, pp. 1956-1976, vol. 35, No. 12.

(Continued)

*Primary Examiner* — Ted M Wang
(74) *Attorney, Agent, or Firm* — Gates & Cooper LLP

(57) ABSTRACT

A receiver, transmitter, and photon counting detector for use in an optical communication link are disclosed. Also disclosed are methods of communicating using the transmitter, the receiver, and the photon detector.

8 Claims, 26 Drawing Sheets

(56) References Cited

OTHER PUBLICATIONS

Itzler, M.A., et al., "SWIR Geiger-mode APD detectors and cameras for 3D imaging", Proceedings SPIE, Jun. 2014, pp. 91140F-1-91140F-12, vol. 9114.

Frechette, J.P., et al., "Readout Circuitry for Continuous High-Rate Photon Detection with Arrays of InP Geiger-Mode Avalanche Photodiodes", Proceedings SPIE, May 2012, pp. 83750W-1-83750W-9, vol. 8375.

Yu, D.F., et al., "Mean and Variance of Photon Counting with Deadtime", Conference Record, IEEE Nuclear Science Symposium, 2000, pp. 1470-1474, vol. 3.

Moision, B., et al., "Deep-Space Optical Communications Downlink Budget: Modulation and Coding", JPL Interplanetary Network Progress Report 42-154, Aug. 15, 2003, pp. 1-28.

Peng, M.Y., et al., "Binary polarization-shift-keyed modulation for interplanetary CubeSat optical communications", SPIE-LASE 2017, Jet Propulsion Laboratory—California Institute of Technology, Jan. 30, 2017, pp. 1-20.

Srinivasan, M., et al., "Photon Counting Detector Array Algorithms for Deep Space Optical Communications", Proc. SPIE 9739, Free-Space Laser Communication and Atmospheric Propagation XXVIII, 97390X, Mar. 15, 2016, doi:10.1117/12.2217971; http://dx.doi.org/10.1117/12.2217971.

\* cited by examiner

1. Beacon Sync Pattern (square wave)

2. Low rate command channel (PPM 2 and 2 guard slots)

3. High rate data channel (PPM 8 and 4 guard slots)
Transmitted signal 900

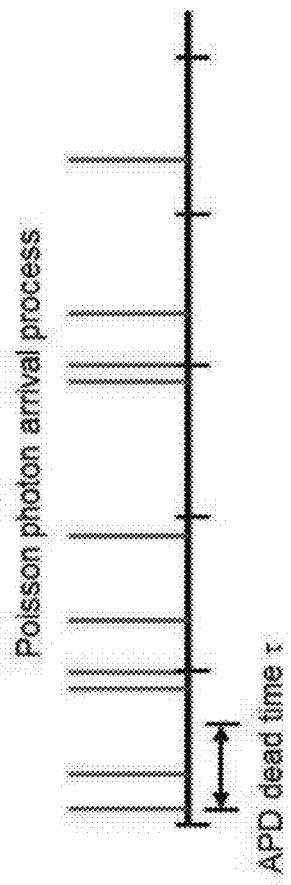
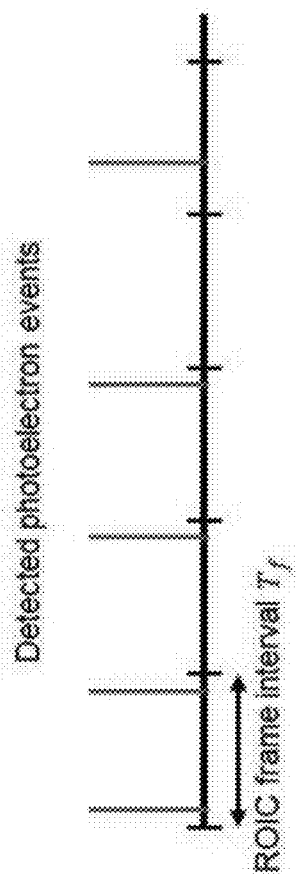
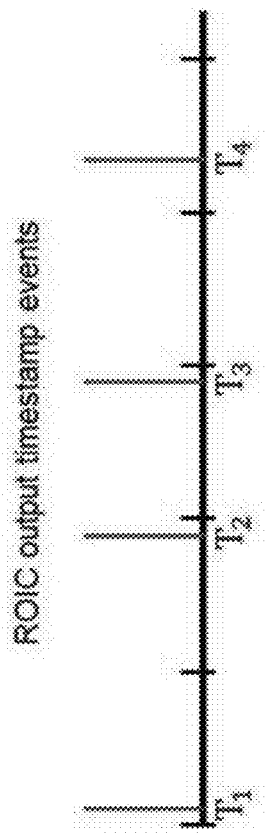
FIG. 10A
FIG. 10B
FIG. 10C

OPTICAL COMMUNICATIONS SYSTEMS

CROSS REFERENCE TO RELATED APPLICATIONS

This application is a divisional under 35 U.S.C. § 121 of co-pending and commonly-assigned U.S. Utility patent application Ser. No. 15/422,363, filed on Feb. 1, 2017 by William H. Farr, Meera Srinivasan, Kenneth S. Andrews, and Andre Wong, and entitled "OPTICAL COMMUNICATION SYSTEMS," which application claims the benefit under 35 U.S.C. Section 119(e) of the following commonly-assigned provisional patent applications:

U.S. Provisional Patent Application No. 62/289,608, filed Feb. 1, 2016, by William H. Farr, entitled "BALANCED GEIGER-MODE AVALANCHE PHOTODIODE DETECTOR FOR BINARY-POLARIZATION-SHIFT-KEYING OPTICAL COMMUNICATIONS";

U.S. Provisional Patent Application No. 62/300,240, filed Feb. 26, 2016, by Kenneth S. Andrews, William H. Farr, Andre Wong, and Meera Srinivasan, entitled "OPTICAL BEACON ACQUISITION AND TRACKING USING UP/DOWN COUNTING ALGORITHMS"; and U.S. Provisional Patent Application No. 62/319,491, filed Apr. 7, 2016, by William H. Farr, entitled "REDUCED POWER/COMPLEXITY POLARIZATION SHIFT KEYED TRANSMITTER FOR OPTICAL COMMUNICATIONS LINKS";

all of which applications are incorporated by reference herein.

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates to methods and devices for optical communication.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

Optical communication technology offers the promise of data rates that are significantly higher than those provided by conventional radio-frequency-based technology. For deep-space applications, power efficient communications is possible in part due to the large effective power gain from narrow optical beamwidths. Consequently, a necessary component of optical communication systems is highly accurate and stable laser beam pointing.

In order to establish and maintain an optical link, accurate uplink and downlink pointing must be performed in the presence of spacecraft motion and disturbances. Disturbance suppression can be achieved through a combination of passive isolation to reduce mechanical coupling between the spacecraft and flight terminal platform, and active cancellation of pointing errors through platform steering and downlink beam steering via a fine steering mirror. Local reference sensors such as inertial reference units may be utilized to provide highly accurate information for active disturbance cancellation, but increase mass and power on the flight terminal, and do not provide a pointing reference to the Earth. In order to minimize mass on the spacecraft transceiver, the Deep Space Optical Communication (DSOC) project at the Jet Propulsion Laboratory uses an uplink beacon transmitted from the ground terminal to provide a reference spot position that may be tracked by the flight terminal.1 By estimating the uplink signal position, the flight terminal platform attitude may be adjusted and the point-ahead angle for downlink transmission may be calculated and implemented. Furthermore, an uplink beacon can also carry command and configuration data. By using a single photodetector array for both pointing and communications, rather than a more conventional architecture consisting of separate detectors for tracking and communications, beam alignment errors and optical losses as well as overall system complexity may be minimized. A photon counting array possesses the best combination of sensitivity and bandwidth for these purposes. Signal processing algorithms for uplink spatial acquisition and tracking, parameter estimation, and command telemetry processing must be therefore be developed in order to simultaneously support tracking and communications for the deep-space optical link.

SUMMARY OF THE INVENTION

The present disclosure describes a transmitter, comprising a polarization maintaining optical fiber having a slow axis and a fast axis; a fiber optic coupler comprising a first coupler input, a second coupler input, and a coupler output, wherein the coupler output is coupled to the optical fiber; a first laser connected to the first coupler input, wherein a first polarization axis of light emitted from the first laser is aligned to the slow axis; a second laser connected to the second coupler input, wherein a second polarization axis of the second laser is aligned to the fast axis; and a circuit comprising first input, a second input, a third input, a fourth input, a first output and a second output.

The optical fiber outputs the electromagnetic radiation having the first polarization axis representing a first binary state and emitted from the first laser, when the first output outputs a signal switching the first laser on in response to the first input receiving a clock signal and the second input receiving a data signal representing the first binary state in a data stream. The optical fiber outputs the electromagnetic radiation having the second polarization axis representing a second binary state and emitted from the second laser, when the second output outputs a signal switching the second laser on in response to the third input receiving the clock signal and the fourth input receiving a data signal representing the second binary state in the data stream.

The present disclosure further describes a receiver, comprising a first photodiode connected to a non-inverting output; a second photodiode connected to an inverter, wherein the inverter is connected to a non-inverting output; a bias input resistively coupled to the photodiodes; an over-biasing input capacitively coupled to the photodiodes; and an output connected to the non-inverting output and the inverting output.

The output sums a first signal at the non-inverting output with a second signal at the inverting output when the first photodiode outputs the first signal to the non-inverting output in response to a first electromagnetic signal received on the first photodiode, an overbiasing voltage applied to the overbiasing input, and a bias voltage applied to the bias input; and/or the inverter outputs the second signal to the inverting output, the second signal formed by inverting the photodiode signal received from the second photodiode in response to a second electromagnetic signal received on the second photodiode, the overbiasing voltage applied to the overbiasing input and the bias voltage applied to the bias input. The first signal at least partially cancels the second signal when the first photodiode receives the first electromagnetic signal and the second photodiode receives the second electromagnetic signal while the bias voltage and the overbias voltage are applied.

The present disclosure further describes signal processing algorithms for optical uplink beacon acquisition, centroiding, and parameter estimation, using a photon-counting detector array. Descriptions of the uplink beacon modulation and flight terminal detector array concept were provided, along with statistical models of the detector output, including blocking. Monte Carlo simulation and laboratory test results using a commercial 32×32 photon counting camera were evaluated parametrically, showing how uplink centroiding accuracy varies with background conditions for realistic system parameters. The results demonstrate that the DSOC acquisition and tracking concept using a single photon counting detector array is capable of achieving the high acquisition probabilities and sub-microradian centroiding accuracy needed for e.g., deep space optical links or other optical communication systems.

The transmitters and receivers described herein can be used in free space optical communication data links, for example.

BRIEF DESCRIPTION OF THE DRAWINGS

Referring now to the drawings in which like reference numbers represent corresponding parts throughout:

FIG. 9A-9C shows an uplink nested modulation signal structure, wherein FIG. 9A shows the beacon sync pattern (square wave), FIG. 9B shows a low rate command channel (PPM 2 and 2 guard slots), and FIG. 9C shows a high rate data channel (PPM 8 and 4 guard slots);

FIG. 10A-10C shows detector/readout pixel blocking, wherein FIG. 10A shows poisson photon arrival process and avalanche photodiode (APD) dead time, FIG. 10B shows detected photoelectron events with Read out Integrated Circuit (ROIC) frame interval $T_f$, and FIG. 10C shows ROIC output timestamp events.

FIG. 21 shows laboratory testbed centroid estimation results for 32×32 single photon counting detector array, shown as a function of Earth flux per pixel, and compared with simulation model, wherein

DETAILED DESCRIPTION OF THE INVENTION

Figure 1:
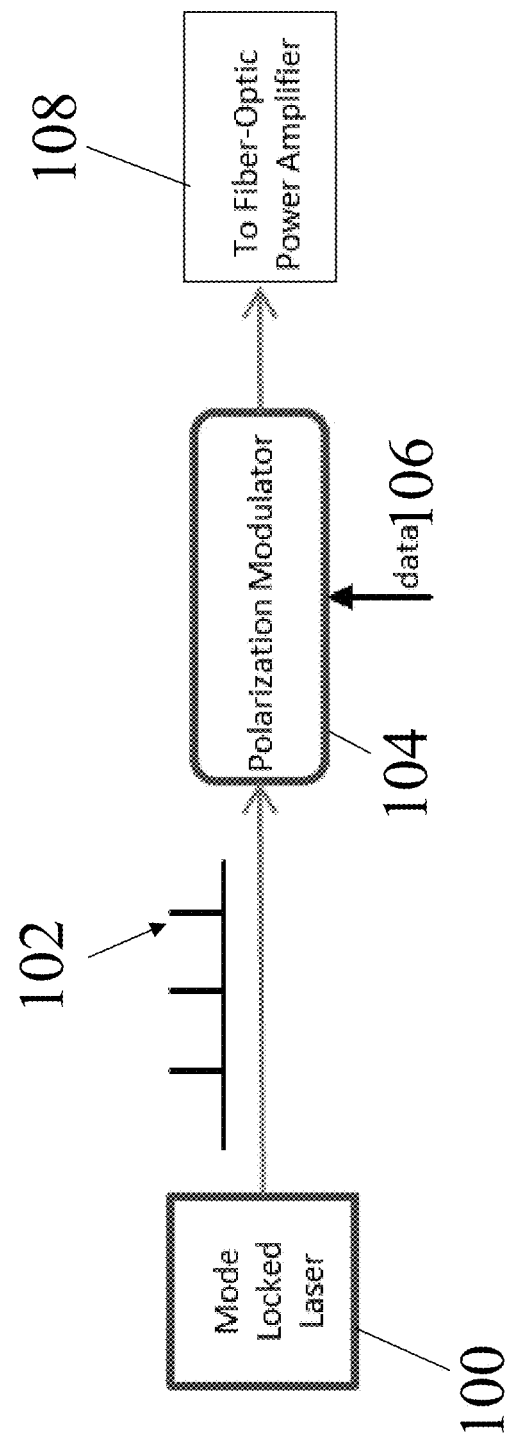
FIG. 1 illustrates a mode-locked-laser plus polarization modulator topology, according to one or more embodiments of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

I. First Example: A Mode Locked Laser for Noise-Limited Optical Communications

1. $R^4$ Range Capacity Loss

For an optical communications signal, when the average received signal power, Ps, is at least about a factor of e/2 (e=2.71828 . . . ) over the noise power, Pb, (either extrinsic noise or internal photodetector noise), the communications capacity, C, (bits per second) is proportional to the signal power, Ps. For space optical communications, this implies a data rate that scales as the distance between the transmitter and receiver (='range', R) squared ($R^2$). However, when noise power dominates, the capacity C scales as $Ps^2/Pb$. In this regime, data rate scales as $R^4$, and the high data rate advantage of optical communications that results from a narrower transmit beam are quickly lost.

2. Acquisition

Before a received signal can be decoded, it first must be 'acquired' from the background. If the average signal power, Ps, is lower than the average noise power, Pb, there must be a way to 'filter out' excess noise to determine the spatial, temporal, and carrier frequency location of the signal. For 'pulse-position modulated' (PPM) optical signal encoding, which trades bandwidth for photon efficiency in optical communications, the peak power per communications symbol is increased by a factor N, where N is the number of time bins per communications symbol. If M of N bins are used to encode data, log-base-2 of M bits are encoded per signal. The remaining non-data bins are herein designated G. The increase in peak power (factor of N) aids signal acquisition by allowing the instantaneous signal power to be above the average background power.

Acquisition can be achieved by correlation on a fixed pattern, such as the lack of signal in the G bins, or by a fixed data sequence, or a single symbol that repeats at a fixed interval ('pilot tone'). In noise limited optical communications, a background power dependent signal power threshold exists below which acquisition cannot occur, and data cannot be recovered.

3. Modulation Bandwidth

Increasing N, corresponding to increasing modulation bandwidth B (proportional to 1/N), increases both C and aids acquisition. However, modulation bandwidths above about 1 GHz require significantly more complicated control circuitry (and additional components), with conventional technology limits presently in the 10 GHz range.

Higher modulation bandwidths also require higher power in control electronics due to the energy required to charge and discharge circuit capacitances through real impedances. Higher complexity and higher power are negative attributes for space optical communications.

4. Mode-Locked Laser Transmitter Implementation

FIG. 1 illustrates a transmitter comprising a mode-locked-laser 100 emitting light comprising mode locked pulses 102 to a polarization modulator 104, wherein the polarization modulator 104 modulates the light with data 106 and outputs the modulated light to a fiber optic power amplifier 108.

Use of a mode-locked laser enables a very high effective N with minimum complexity and power.

A mode-locked laser utilizes a non-linear inter-cavity element to generate a fixed rate train of narrow pulses (5 ps or less, typical, corresponding to >200 GHz modulation bandwidth), most commonly at pulse repetition frequencies (PRF) in the 20 to 120 MHz range, although repetition rates below 1 MHz and above 10 GHz have been demonstrated.

In one embodiment, communications requires data encoding on the fixed pulse train carrier. One method would be to put the mode-locked laser output into a switched set of optical delay lines, creating PPM symbols. Another method would be to use a mode-locked laser with a linearly polarized output and add a variable polarization rotation control element at the output. For M polarization states, log-base-2 M bits can be encoded.

With a polarization-modulated mode-locked laser, the output pulse train occurs at a single fixed repetition rate. Initial acquisition is aided by the narrow temporal spectrum and high peak power. Once acquired, all of the background noise outside the single data slot of the symbol can be rejected. In the noise limited regime, C now is proportional to Ps/(B Pb). Doubling the bandwidth B doubles the data rate in this regime. In practice, the limit on B may be limited by detector timing resolution, versus the pulse width of the mode-locked laser output.

The use of the mode-locked laser, versus a conventional pulse-carved continuous wave laser, allows optical communications links to be established in background noise regimes where the signal could not be acquired using conventional modulation schemes.

Very high modulation bandwidth is an inherent feature of the laser source, versus the complexity and high ancillary power consumption of multi-GHz (or multi-hundred-GHz) modulation required in the conventional scheme. With the mode-locked laser the required modulate rate occurs only at the symbol (=PRF) rate, a factor of N lower than the conventional scheme.

The mode-locked laser modulation scheme allows simplified optical filtering before the receiver photodetector. For a conventional on-off-keyed optical system, the minimum required optical bandwidth is on the order of ten times the modulation bandwidth. However, optical filters narrower than a few-hundred GHz are difficult to fabricate with simultaneous high transmission in the 'pass' band and high rejection out of band, and often have severe field-of-view restrictions which prohibit use with large telescopes desired for space optical communications. For instance, with an optical carrier at 1550 nm (about 200 THz), a state-of-the-art filter for a 5 m telescope has a 0.17 nm bandwidth, about 22 GHz, with about 80% transmission efficiency. For a 1 Mb/s link, this represents a factor of about 2000 times more background noise into the system than required by the signal bandwidth. In contrast, a 5 ps mode-locked laser system could use a filter with ten times greater bandwidth, and over 95% transmission efficiency. Assuming a 50 ps timing resolution photodetector and binary modulation at a 1 MHz PRF, an additional noise factor rejection of (1,000,000 ps/50 ps)=20,000 is obtained after detection, for a 2000 times increase in noise rejection over the narrower optical filter.

5. Example Applications, Advantages, and Improvements

The new mode-locked laser source and modulation scheme has benefits to cubesat optical communications, lander/rover Direct-to-Earth communications, lander/rover to orbiter proximity link operations, and optical trunkline communications beyond Jupiter. It also has potential DoD/IC applications for low-probability-of intercept communications and high data rate battlefield communications. The mode-locked laser scheme can also fulfill commercial building to building high data rate link applications by enabling optical communications under common high-loss conditions such as rain, fog, and smog.

The conventional pulse-carved continuous wave laser scheme has been well studied to apply to high-data rate trunk-lines for space optical communications out to perhaps Jupiter range, but does not readily scale down to either large range (beyond Saturn) or low data rate applications such as cubesat optical communications and Mars rover direct-to-Earth communication due to the Pb limited transition to a $R^4$ data rate scaling. A simple way of viewing this relation would be to state that while with a conventional pulse-carved continuous wave laser it is possible to build an optical telecommunications system with over ten times the data rate performance of an equivalent mass and power radio-frequency (RF) telecommunications system, the converse is not true: you cannot implement the RF telecommunications rate with a 1/10th mass and power optical communications system. Using the mode-locked laser source, the latter statement no longer holds.

The narrow pulses and fixed PRF structure inherent with the mode-locked laser modulation scheme also simplifies optical ranging schemes, and can support millimeter resolution optical ranging for improved spacecraft navigation. New performance domains in post-Newtonian astrophysics, 'light' science, and planetary studies are feasible using the mode-locked laser in space applications.

II. Second Example: Reduced Power and Complexity Polarization Shift Keyed Transmitter for Optical Communications Links

1. Introduction

As discussed in section I, polarization modulation of a fixed-rate optical pulse train is advantageous for establishing optical communications links under high loss and high optical background scenarios. Theoretical analysis and laboratory demonstrations have been performed that show the benefits for Mars surface direct-to-Earth, deep space optical communications cubesats, and ground links in the presence of inclement weather. Realizations include the optical transmitter solution comprising a mode-locked laser and polarization modulator described in section I (schematically depicted in FIG. 1) and a functional system utilizing a bulk crystal polarization modulator described above. However, a bulk crystal modulator requires several hundred volts of drive voltage, which becomes problematic for megabit per second data rates as this translates into many watts of power required for just the modulator alone, independent of the desired optical transmit power, which may be less than one watt!

Figure 2:
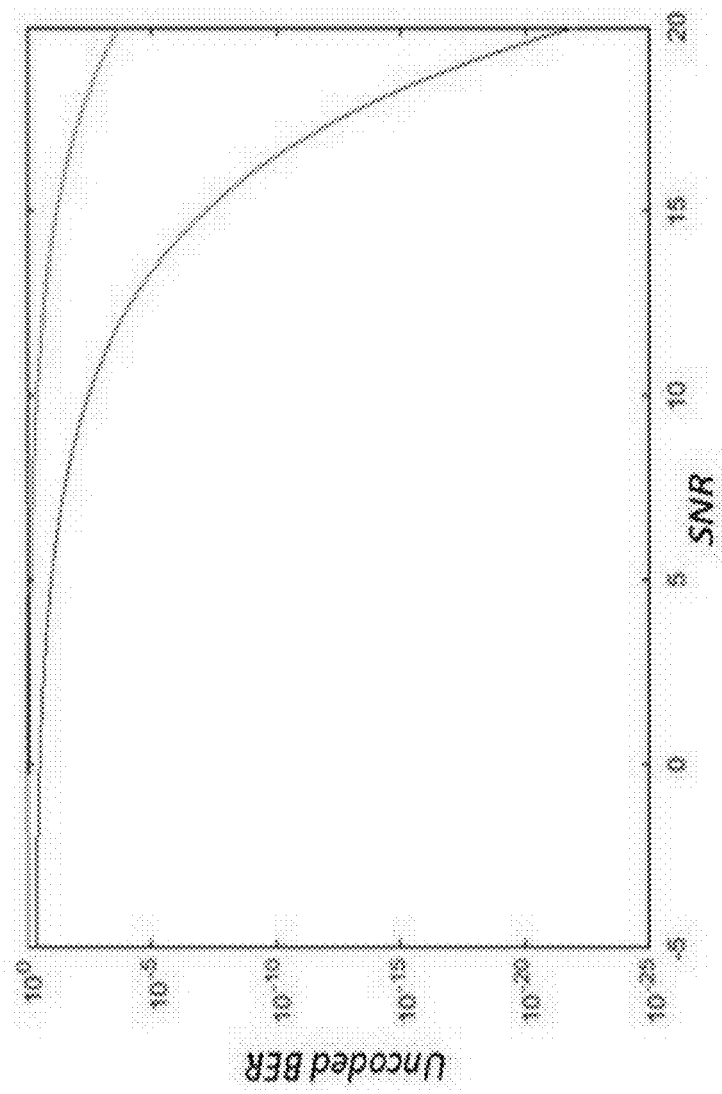
FIG. 2 illustrates modeled Bit Error Rate (BER) for infinite (blue) versus measured (red) BER Polarization Extinction Ratio (PER), wherein using a commercial LiNbO3 modulator resulted in only 6 dB PER with mode locked laser pulses, versus measured 16.5 dB PER before the modulator (performance is thus degraded by >8 dB at 10-3 BER)

To reduce size, weight, and power, a fiber-optic implementation can be considered; however, as shown in FIG. 2, large group velocity dispersion for the broad band few-picosecond mode locked laser pulses effectively precludes the use of lithium niobate as used in common commercial modulators, instead requiring expensive/customized modulators in a material such as gallium arsenide.

Figure 3:
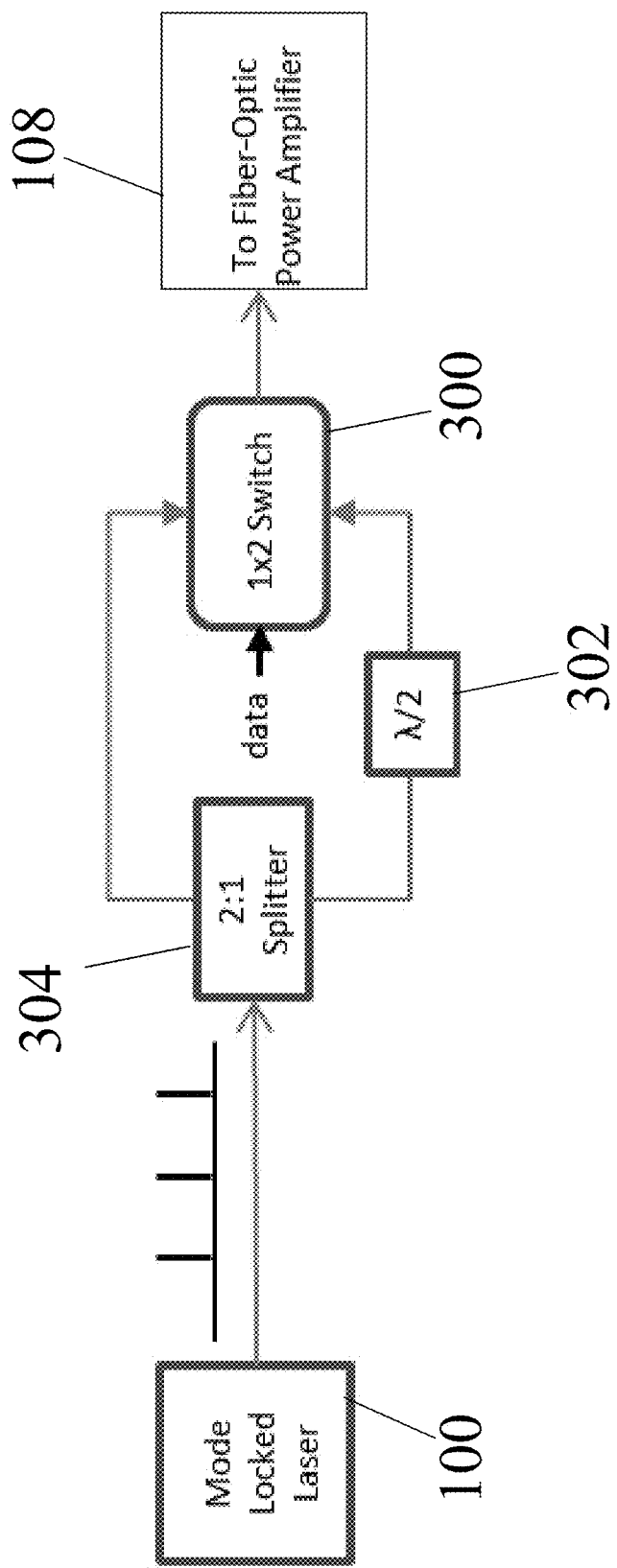
FIG. 3 illustrates a polarization modulator for a mode locked laser (MLL) using a LiNbO$_3$ optical switch, wherein the λ/2 element represents 90° polarization rotation (note: replacing this element with a delay line creates a PPM-2 modulator)

As depicted in FIG. 3, it is possible to utilize lithium niobate switches 300 coupled with polarization controllers 302 and fiber-optic couplers, but such an implementation becomes much more complicated and difficult to stabilize over ambient temperature variations, and such a system features a minimum 6 dB transmission loss due to the input beamsplitter 304. In any of the above described fiber-optic modulator cases, modulator power consumption is still high, on the order of a watt for megabit per second data links.

1. Transmitter Example

Figure 4:
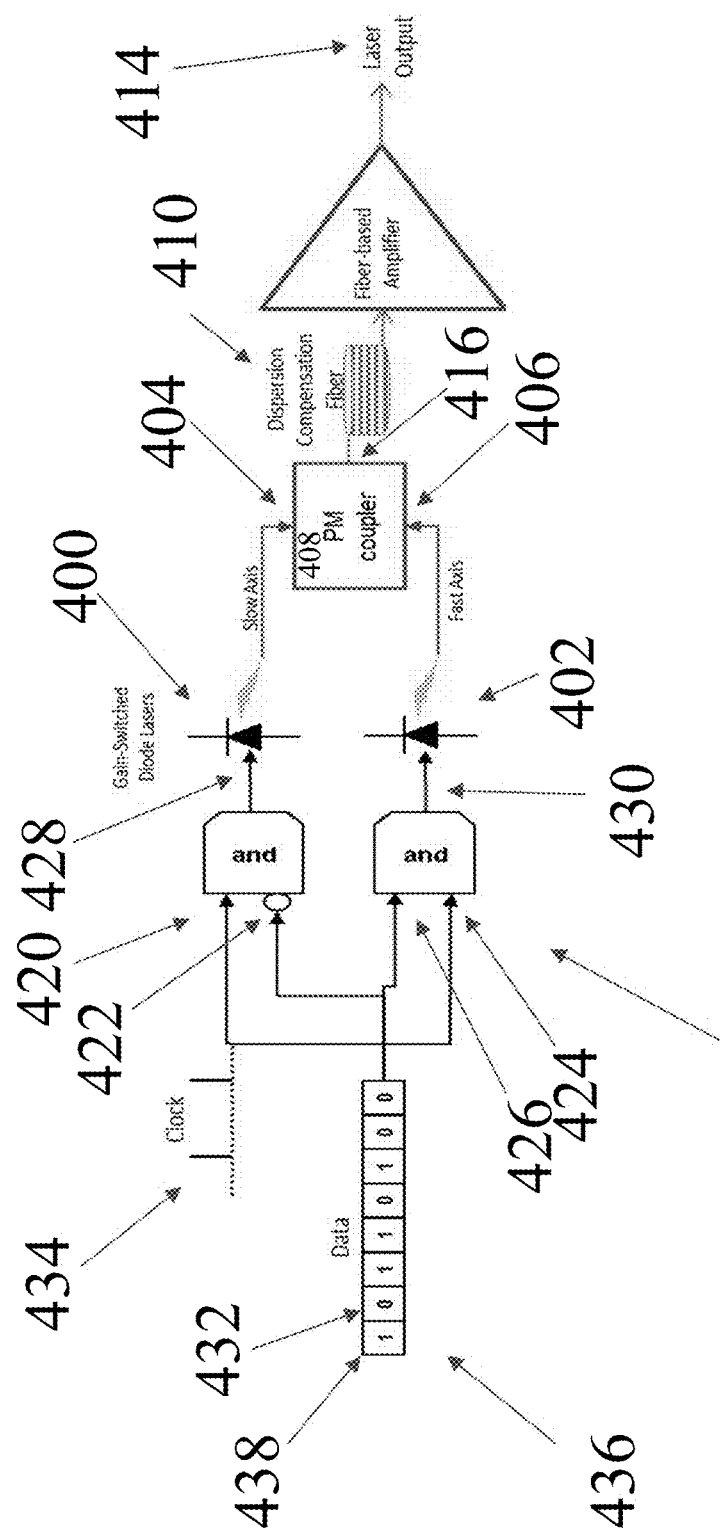
FIG. 4 illustrates polarization modulation using a pair of gain switched diode lasers, according to one or more embodiments of the invention, wherein the output from a simple 5V logic gate can be converted to the required short electrical drive pulse by a low power step recovery diode circuit.

FIG. 4 illustrates a novel modulator scheme comprising two gain switched diode lasers 400, 402 coupled to orthogonal polarization inputs 404, 406 of a polarization maintaining fiber-optic coupler 408, with the polarization axis of one laser 400 being aligned to the "slow" axis of a polarization maintaining fiber 410, and the polarization axis of the second laser 402 being aligned to the "fast" axis of a polarization maintaining fiber 410. As the two polarizations are separate optical modes, they may be combined with theoretically zero loss into a single (spatial) mode output fiber 410, herein presumed to also be polarization maintaining. To produce the modulated output, one diode 400 is pulsed to represent a binary "zero", while the other laser 402 is pulsed to represent a binary "one". The modulation rate can be at a fixed frequency, yielding an output identical to the mode-locked-laser followed by a polarization modulator, or it can now incorporate variable pulse spacings to take advantage of modulation schemes such as pulse position modulation to achieve higher bits-per-photon link efficiencies that is possible with just binary polarization modulation alone.

In one or more embodiments, the nominal output pulse energies of the modulator may typically be in the picojoule range, which may be too low for many desired operational scenarios. In embodiments requiring higher output pulse energies and higher average output powers, the output from the polarization-maintaining fiber optic coupler is followed by a conventional polarization-maintaining fiber optic amplifier 412 to achieve watt level average output powers 414.

Thus, more generally, FIG. 4 illustrates a transmitter comprising a polarization maintaining optical fiber 410 having a slow axis and a fast axis; a fiber optic coupler 404 comprising a first coupler input 404, a second coupler input 406, and a coupler output 416, wherein the coupler output 416 is coupled to the optical fiber 410; first (e.g., gated) laser 400 connected to the first coupler input 404, wherein a first polarization axis of light or electromagnetic radiation emitted from the first laser 400 is aligned to the slow axis; a second (e.g., gated) laser connected to the second coupler input 406, wherein a second polarization axis of electromagnetic radiation or light emitted from the second laser 402 is aligned to the fast axis; a circuit 418 comprising first input 420, a second input 422, a third input 424, a fourth input 426, a first output 428 and a second output 430. The optical fiber 410 outputs the electromagnetic radiation having the first polarization axis representing a first binary state 432 (e.g., 0) and emitted from the first laser 400, when the first output 428 outputs a signal switching the first laser 400 on in response to the first input 420 receiving a clock signal 434 and the second input 420 receives a data signal representing the first binary state 432 in a data stream 436. The optical fiber 410 outputs the electromagnetic radiation having the second polarization axis representing a second binary state 438 and emitted from the second laser 402, when the second 430 output outputs a signal switching the second laser 402 on in response to the third input 424 receiving the clock signal 434 and the fourth input 426 receiving a data signal representing the second binary state 438 in the data stream 436.

In the embodiment shown in FIG. 4, the circuit comprises a logic circuit comprising a first AND gate having the first input 420, second input 422 and the first output 428, and the second AND gate having the third input 424, fourth input 426, and the second output 430, wherein the second input 422 is an inverting input. However, other logic circuits may be used.

2. Advantages and Improvements

A pair of gain-switched diode lasers with polarization maintaining fiber-coupled outputs combined with a low-loss (<3 dB) polarization maintaining fiber optic coupler yields a modulation solution with only 10's of milliwatts average power dissipation, versus watts for the separate laser plus modulator solution.

Furthermore, unlike the mode-locked-laser optical transmitter, this configuration allows easy implementation of pulse position modulation combined with polarization modulation for higher bits per-photon efficiency when allowed for lower loss and background noise optical communications scenarios A diode laser can naturally generate a linearly polarized output state. Gain-switching of a diode laser is a well-established technique to directly generate optical output pulses of a few 10's of picoseconds from longer (nanosecond scale) electrical pulses. In a gain-switched configuration the diode laser is biased well below threshold, for instance on the order of one milliampere, and a short electrical pulse drives the diode laser well above threshold, for instance on the order of 80 milliamperes. The initial gain of the diode laser is very high, and the result is a very short optical pulse, similar to a Q-switched pulse from a gain modulated crystal laser. Before the diode laser can settle down to a steady-state condition with continuous optical output, the electrical drive pulse is removed, resulting in a single optical pulse per electrical input pulse, with the optical pulse being much shorter than the electrical drive pulse.

Moreover, the optical transmitter topology described in FIG. 4 has further advantages over a mode-locked-laser plus polarization modulator for optical communications under high loss and high background scenarios:

(1) Pulse-to-pulse timing is now set by an external electronic circuit, versus the physical laser cavity length that sets a fixed pulse repetition frequency in the mode locked laser. This enables (a) dynamic pulse rates to optimize data transmission rate under different loss and background conditions, and (b) data encoding using time bin modes, such as pulse position modulation.

(2) Optical modulators are implemented with materials that all exhibit an optical frequency dependent index of refraction, which results in a different propagation delay through the system as a function of optical frequency (i.e., color). The result is "group velocity" dispersion which results in pulse spreading. This is especially problematic for the broad bandwidth associated with picosecond pulses (order of several angstroms) desired for the high loss/high background optical communications links, resulting in a very poor extinction ratio in the specific case of a polarization modulator. The "Ping-Pong" laser scheme, using one laser to represent binary zero, and the other to represent binary one, removes the separate modulator element, thus eliminating the problem. In addition, the optical combining element, the polarization maintaining fiber-optic coupler, has minimal dispersion over many nanometers of bandwidth, and does not contribute to any significant pulse broadening.

III. Example 3: Photodiode Detectors for Binary-Polarization-Shift-Keying Optical Communications As discussed above, binary-polarization shift keying (BPolSK) modulation of a mode-locked laser is method to establish an optical communications link under high-loss/high-background conditions. Photon counting direct detection of the polarization demodulated signal is near capacity-achieving. However, the operational efficiency of the link can be severely limited by the saturation characteristics of Geiger-Mode Avalanche Photodiodes (GmAPD) that are common and attractive for use as photon counting detectors.

1. Example Receiver

Figure 5A:
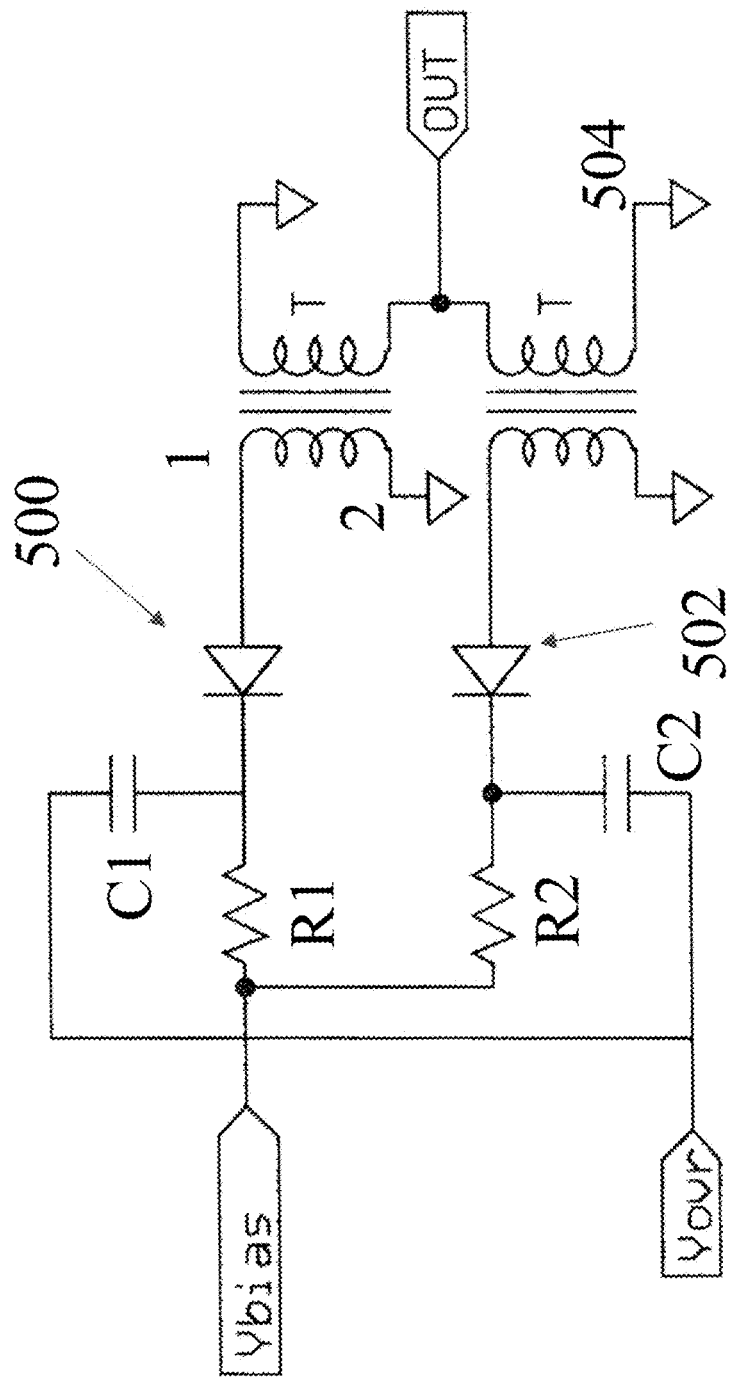
FIGS. 5A and 5B depicts examples of balanced GmAPD connection, according to embodiments of the present invention.

FIG. 5A illustrates a circuit in a receiver, wherein the circuit comprises two Geiger Mode Avalanche Photodiodes (GmAPDs) 500, 502 with matched breakdown voltages and junction capacitances biased in parallel from a common voltage source through independent current limiting resistors R1, R2, which typically would have a value greater than one kiloOhm. For the case of applying the bias Vbias at the GmAPD 500, 502 cathode, the bias will be positive. The bias voltage Vbias would be set to slightly below the breakdown voltage. Overbias pulses Vovr from a common pulsed low impedance (50 Ohm, typical) source are applied through parallel AC coupling capacitors C1, C2. For positive bias GmAPD read-out can be taken from the anodes through parallel transformers T, with one end of each winding connected to the GmAPD 500, 502 anode, and the other connected to ground. The output windings of the transformers are connected such that one non-inverted and one inverted output are summed. The output sum point (OUT) then is inputted to an amplifier chain with a typical 50 Ohm input impedance. Capacitive feedthrough of the over-bias pulses is naturally cancelled in this configuration, and a photon detection event on one detector will create a positive going pulse, whereas a photon detection event on the other detector will create a negative going pulse. Simultaneous detection events would cancel, creating no detectable output for that over-bias pulse.

One or more embodiments of the invention are not limited to the use of transformers. More generally, the non-inverted and inverted outputs allowing cancellation can be achieved by using circuit comprising an inverting circuit or inverter, including, but not limited to, transformers.

Figure 5B:
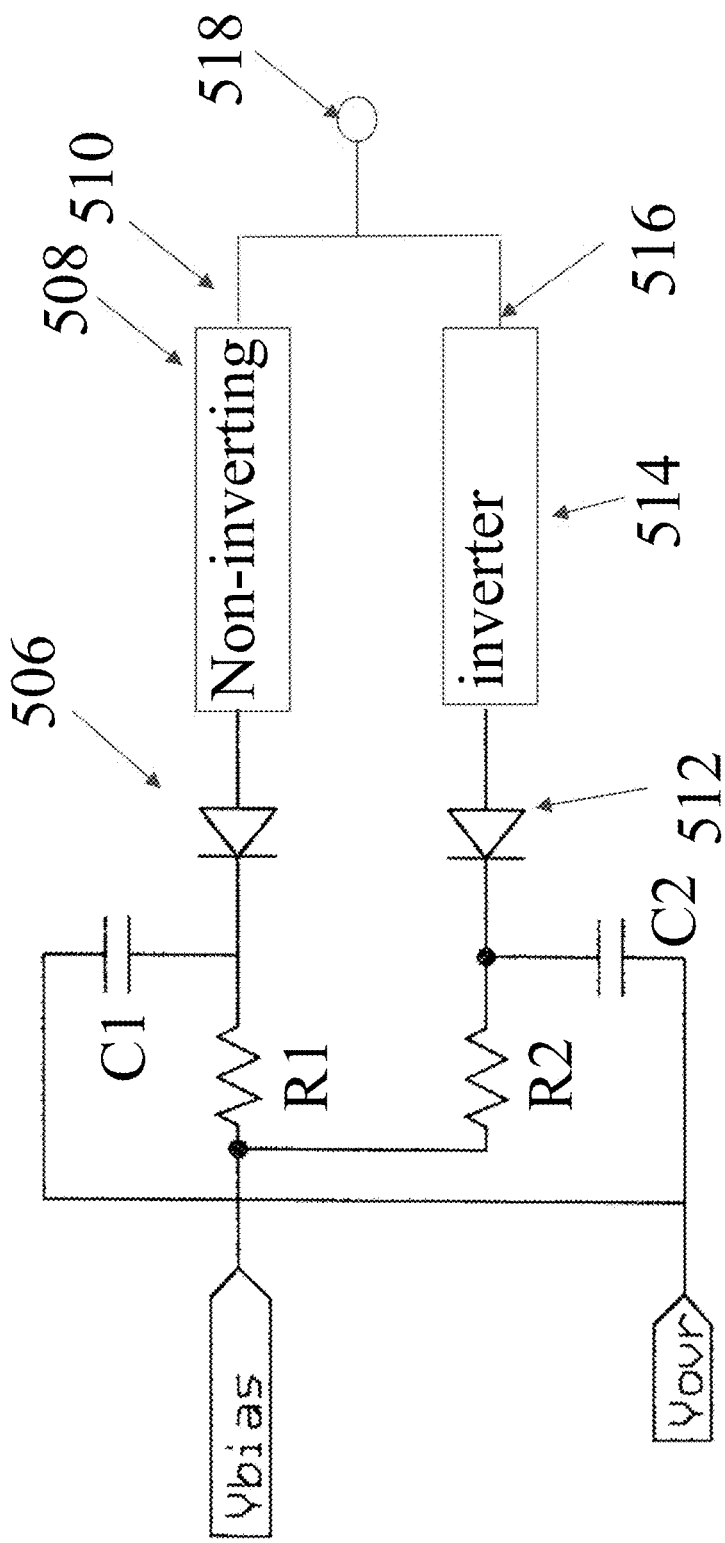

FIG. 5B illustrates a circuit comprising a first photodiode 506 connected to a non-inverting circuitry, circuit elements/components 508 having a non-inverting output 510; a second photodiode 512 connected to an inverter or inverter circuit 514, wherein the inverter 514 comprises an inverting output 516; a bias input Vbias resistively coupled to the photodiodes 506; an over-biasing input Vover capacitively coupled to the photodiodes; an output 518 connected to the non-inverting output 510 and the inverting output 516. The output 518 sums a first signal at the non-inverting output 510 with a second signal at the inverting output 516 when (1) the first photodiode 506 outputs the first signal to the non-inverting output 510 in response to a first electromagnetic signal received on the first photodiode 506, an overbiasing voltage Vovr applied to the overbiasing input, and a bias voltage Vbias applied to the bias input; and/or (2) the inverter 514 outputs the second signal to the inverting output 516, the second signal formed by inverting the photodiode signal received from the second photodiode 512 in response to a second electromagnetic signal received on the second photodiode 512, the overbiasing voltage Vovr applied to the overbiasing input and the bias voltage applied Vbias to the bias input.

The first signal at least partially cancels the second signal when the first photodiode receives the first electromagnetic signal and the second photodiode receives the second electromagnetic signal while the bias voltage and the overbias voltage are applied.

In one or more embodiments, the photodiodes have substantially similar/same circuit characteristics (e.g., substantially similar stray capacitance and inductance). In one embodiment, the photodiodes have the same breakdown voltage. In another embodiment, the photodiodes have different breakdown voltages.

Figure 6:
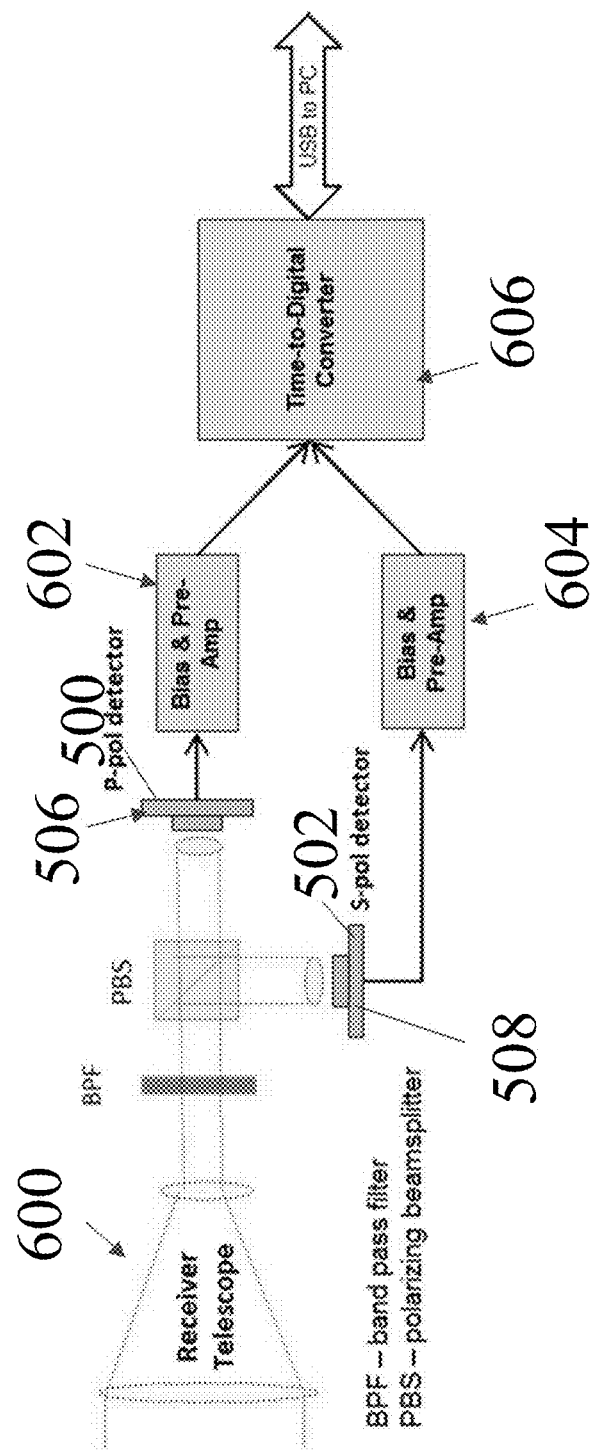
FIG. 6 illustrates a BPolSK GmAPD receiver according to one or more embodiments of the present invention.

FIG. 6 illustrates an embodiment of a BPolSK receiver wherein the optical signal is collected by a receiver telescope 600 and an optical filter BPF passes only the modulated optical signal frequencies. A polarization-sensitive beamsplitter PBS splits the received BPolSK signal into two orthogonal beams, which are independently focused onto separate GmAPD detectors 500 and 502 or 506 and 512 in the circuits of FIG. 5A or FIG. 5B. The detectors 500, 502, 606. The circuits of FIGS. 5A and 5B are also connected to bias and pre-amps 602, 604. The summed output OUT or 518 from FIG. 5A or FIG. 5B is then input to a polarity sensitive time-to-digital converter 606, for instance, which would capture the time-of-arrival for each detected photon event, for instance assigning a positive going pulse as equivalent to a binary '1', and a negative going pulse as equivalent to a binary '0'. The converter 606 is connected, e.g., with a USB connection, to a personal computer PC.

The synchronous over-biasing of the GmAPD detectors at the laser pulse repetition frequency minimizes detected noise photons. The series connection of two GmAPDs, one on each port of a polarizing beamsplitter (PBS), combined with opposite polarity driving of the over-bias voltages, (a) negates the charge feedthrough that occurs due to the dV/dT of the bias source across the GmAPD capacitance, and (b) automatically cancels the detected photon count output in the event of the error condition of simultaneous detection of a photon at each output port of the PBS (i.e., two total). The overall effect is to reduce the total number of photons detected by maximizing the number of rejected noise photons, thus mitigation both GmAPD saturation, other GmAPD imperfections such as after-pulsing, and reducing the processing load on the data receiver.

Figure 7:
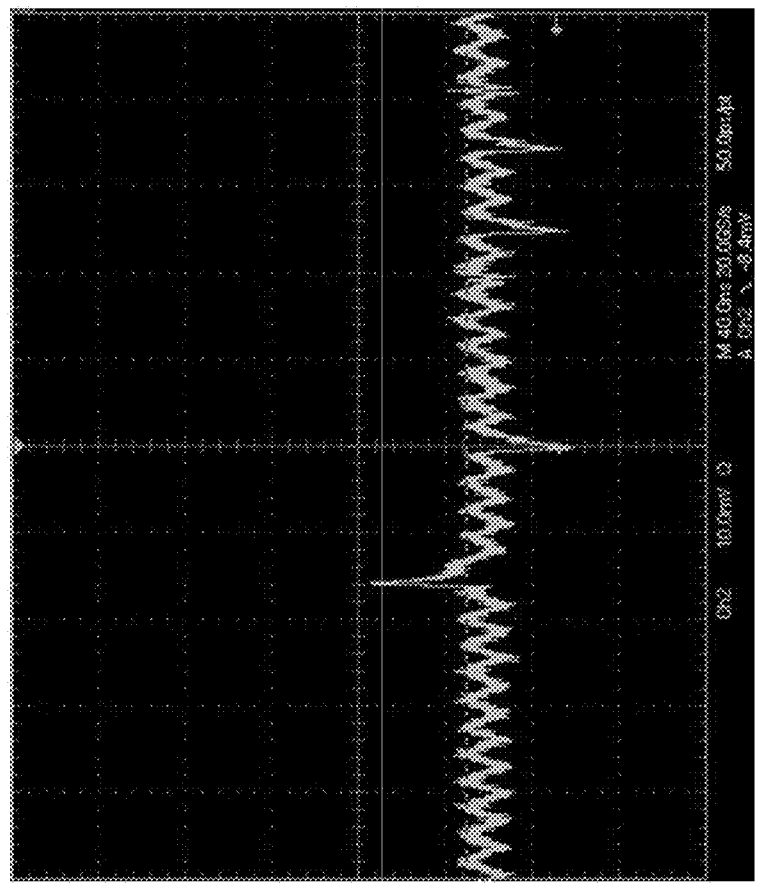
FIG. 7 illustrates BPolSK receiver analog signal output using the circuit of FIG. 6.

FIG. 7 illustrates an output from the system of FIG. 6, wherein positive going pulses represent detection of a 'p' polarized photon, and negative going pulses represent detection of an 's' polarized photon. Residual over-bias pulse feedthrough from junction capacitance mismatch is evident as the small residual sine wave component of the output. However, the single photon detection events are readily thresholded from this background noise.

Further information on one or more embodiments of the receiver can be found in reference [9].

2. Advantages and Improvements

The balanced detection scheme minimizes the amount of avalanche charge flowing through the GmAPD junction, with the benefit of reducing trapped charge in the devices. Reduced trapped charges means reduced "hold-off" time for the GmAPDs. Hold-off time is required to allow trapped charges to thermally de-trap, otherwise a charge which de-traps during an over-bias period would create a false detection event. As an example, for an InGaAs on InP GmAPD, the required holdoff time can be reduced from over one microsecond to less than ten nanoseconds. As a detector cannot detect a photon arrival event during the hold-off time, the impact is greatly improved dynamic range (=count rate) capability. This configuration is a natural match to BPolSK, which requires two detectors, one for each orthogonal polarization.

IV. Example 4: Photon Counting Detector Array

1. System Overview and Modeling of a Transceiver Embodiment

The deep-space optical communications flight transceiver [1] relies upon use of a modulated uplink beacon in order to assist downlink pointing and provide uplink command and data links.

Figures 8A, 8B:
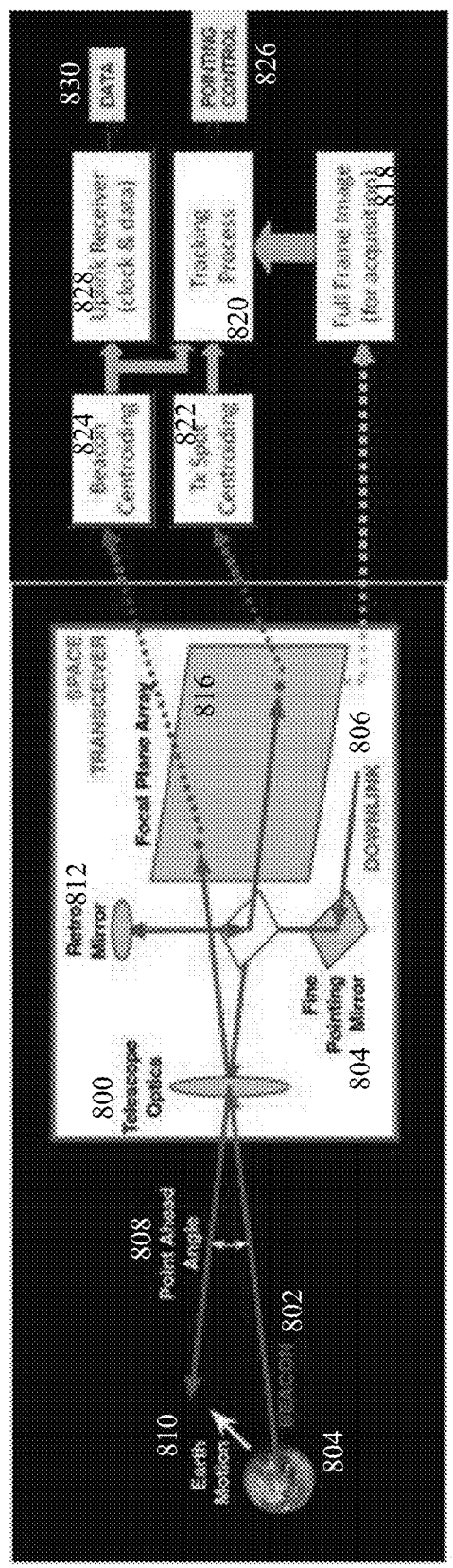
FIG. 8A illustrates a space transceiver and FIG. 8B illustrate a deep space optical communications flight terminal pointing and tracking concept according to one or more embodiments.

FIG. 8A illustrate a space transceiver according to one or more embodiments of the invention, comprising telescope optics 800 receiving a beacon 802 from the earth 804 and transmitting a downlink beam 806 with a point ahead angle 808 taking into account motion 810 of the earth, retro mirror 812, fine pointing mirror 814, and focal plane array 816 receiving the beacon 802.

FIG. 8B illustrates a deep space optical communications flight terminal pointing and tracking concept according to one or more embodiments, comprising the focal plane array 816 outputting a full frame image 818 (for acquisition), performing a tracking process 820 using the full frame image using input from transmitter (tx) spot centroiding 822 and beacon centroiding 824. The tracking process 820 outputs to a pointing control 826 and an uplink receiver 828 outputs data 830 and receives input from beacon centroiding 824.

As shown in FIGS. 8A and 8B, a single aperture for both transmit and receive beams simplifies boresight alignment issues and enables continuous monitoring of the downlink point-ahead angle by imaging both uplink and downlink signals onto one common focal plane array (FPA) of single-photon-counting detectors, which is used for uplink acquisition and tracking, downlink point-ahead verification, and uplink data detection. The FPA converts the uplink photons into attitude information based upon the spatial distribution of photons on the detector pixels, and into temporal information via time of arrival data that is used to recover the pulse-position modulated uplink data. The major FPA signal processing operations are Uplink beacon detection and acquisition: Scanning of the flight transceiver platform to detect and coarsely determine the uplink beacon position.

Uplink beacon tracking: Fine estimation and control of the uplink beacon position.

Downlink point-ahead verification: Position estimation of the retro-reflected portion of the downlink laser to verify the angular offset between the received beacon and the downlink transmitted beam.

Uplink data demodulation: Timing synchronization, parameter estimation, and data decoding.

2. Uplink Beacon Signal Example

Figure 9A:
Figure 9B:
Figure 9C:
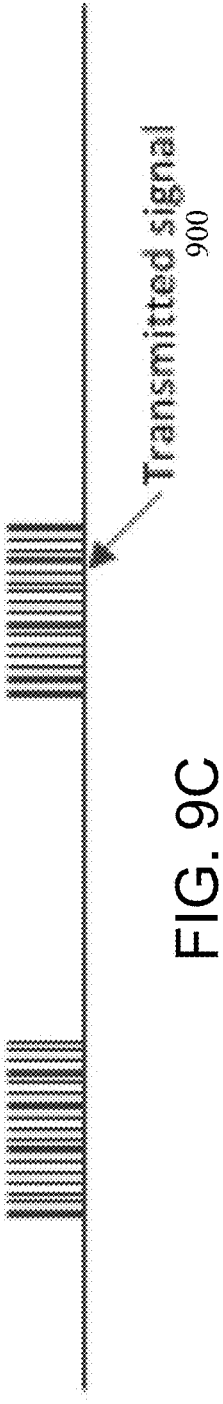

In one or more embodiments, the uplink signal is a nested modulation format that contains a low-bandwidth command channel and an optional higher rate data channel. The inner data modulation consists of higher order pulse position modulation (PPM), while the low rate outer command modulation consists of 2-PPM with two intersymbol guard-time (ISGT) slots [2] (see FIG. 9A-9C showing the transmitted signal 900). If the optional high rate data channel is included, a block of higher order PPM symbols (with ISGT) is sent in one of two time intervals of duration $T_c$, which are followed by two additional time intervals of duration $T_c$, with no signal, thereby creating the 2-PPM+2-ISGT command symbol of duration $4T_c$. If the high rate data is not included, then the 2-PPM+2-ISGT with slot duration $T_c$ is implemented directly. In either case, the average intensity envelope of the combined modulation layers is a square wave that forms a beacon signal whose alternating pattern may be exploited for background rejection, [3] signal acquisition and tracking. Here, it is assumed that the higher rate data channel is not implemented.

3. Detector Output

In one embodiment, the flight detector consists of a square array of Geiger mode avalanche photodiode (APD) detectors. [4, 5] Each detector pixel in the array is a single-photon-counting detector that outputs an electrical pulse in response to a photon arrival. When operating in Geiger mode, the APD must be quenched after each photon event and then held disarmed for a recovery period, introducing a dead time into the detection process. The result is that photons arriving after the initial photon arrival and before the end of the dead time interval cannot be detected. This blocking effect limits the output count rate of the detector and reduces the effective detection efficiency. The recovery time, or dead time, is typically an adjustable quantity. The output count rate is also limited by the readout frame rate; the readout integrated circuit [6] (ROIC) bonded to the APD array outputs a timestamp corresponding to each detected photon arrival pulse, and this timestamp output is gated so that at most one timestamp per pixel is produced for each readout frame interval of duration $T_f$. Consequently, for each pixel, only the first photon arrival detected in any frame interval gives rise to an output timestamp, or count. The flight detector blocking model is illustrated in FIG. 10A-10C, where some incident photon arrivals are undetected due to the APD dead time $\tau$, and others go undetected due to the ROIC frame limit. In one application described herein, the APD dead time $\tau$ is on the same order as the frame time $T_f$, so in order to simplify analysis we combine the two effects into a single non-paralyzable blocking model with blocking time $\tau$.

For the signal processing functions listed in section 2, it is sufficient to know the number of photon counts over various time intervals rather than the high resolution timestamp values. In the absence of detector blocking time, the number of detected photon events is modeled as a Poisson process in which the probability of detecting k events over a time interval of duration T is given by $$P[X(T) = k] = \frac{(\lambda T)^k}{k!} e^{-\lambda T} \quad (1)$$

where X(T) is the number of detected counts over an interval of duration T and $\lambda$ is the average photon arrival rate. Once blocking is considered, the blocked detected count process $X_{bl}(T)$ is no longer Poisson, but may be approximated as Gaussian distributed [7] with mean and variance $$E\{X_{bl}(T)\} \approx \frac{\lambda T}{1+\lambda \tau}, \text{Var}[X_{bl}(T)] \approx \frac{\lambda T}{(1+\lambda \tau)^3}, \text{for } \tau < T. \quad (2)$$

Figure 11:
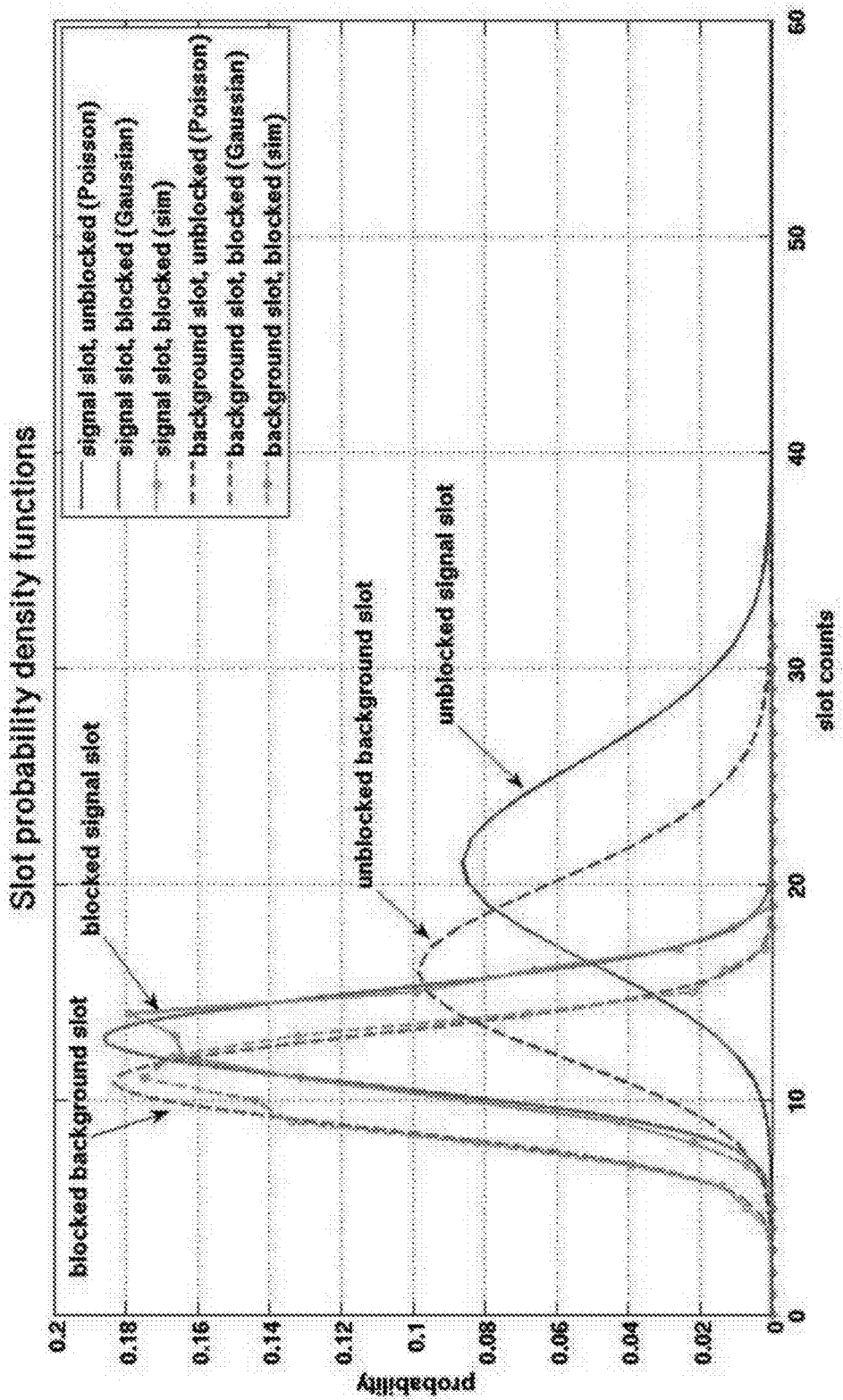
FIG. 11 shows unblocked and blocked photoelectron count statistics for signal and background slots, showing histograms from blocking simulation and Gaussian blocked count model.

FIG. 11 shows histograms of slot count statistics collected from simulations of the detector output for a case with mean signal counts per symbol $K_s \triangleq \lambda_s T_{sym} = 7$ and mean background counts per slot of $K_b \triangleq \lambda_b T_{slot} = 16$.

The probability mass functions of the unblocked Poisson count processes for the signal and non-signal slots are shown, along with corresponding histograms for the simulated blocked process with $\tau/T_{slot} = 0.03$. The Gaussian model for the blocked probability mass function is also plotted, demonstrating that it is a good approximation to the simulated process. The inventors observe that the effect of blocking is to reduce the mean of the signal slot (which contains signal plus background) from 23 to 13, and that of the background-only slot from 16 to 11. The variance of the blocked probability mass functions are also reduced. As the number of incident background photons increases to the point at which the detector is saturated (a count always detected in every ROIC output frame), the blocked signal and background slot count distributions move closer together and further to the right, both eventually reaching the value $T_{slot}/\tau$, resulting in losses in spatial tracking and data demodulation.

4. Algorithms

Here the focus is upon algorithms for spatial signal detection and tracking using the beacon sync pattern, as well as signal parameter estimation. Signal processing for the demodulation and decoding of the transmitted uplink data is not addressed here. For spatial tracking, the objective is to estimate the position of the uplink beacon spot upon the FPA in order to provide an accurate reference for pointing the downlink beam. This position estimate must have sub-microradian accuracy. In the presence of high background fluxes, the accuracy of the position estimate is compromised. For example, the traditional centroid algorithm, which in the limit is the maximum likelihood position estimate, will produce an estimate that is biased towards the center of mass of the Earth. In order to obtain an unbiased position estimate, our approach is to perform the centroiding on a set of statistics that have been modified to effectively subtract out the contribution from background photons. By alternately incrementing and decrementing two photon arrival counters ("up-down counting") that are offset by one-quarter of the square wave period, [3] one or more embodiments of the present invention construct pixel statistics for detecting signal presence in the absence of temporal synchronization of the counters with the received signal. This leads to a faster spatial acquisition and tracking sequence.

5. Background Subtraction

Figure 12A:
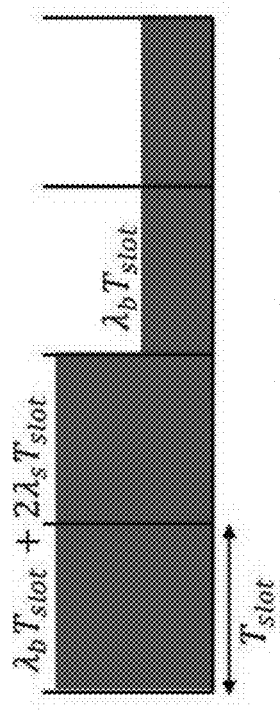
FIG. 12A shows beacon slot average intensity and statistics, wherein FIG. 12 A shows 2=PPM+2=ISGT average beacon intensity envelope
Figure 12B:
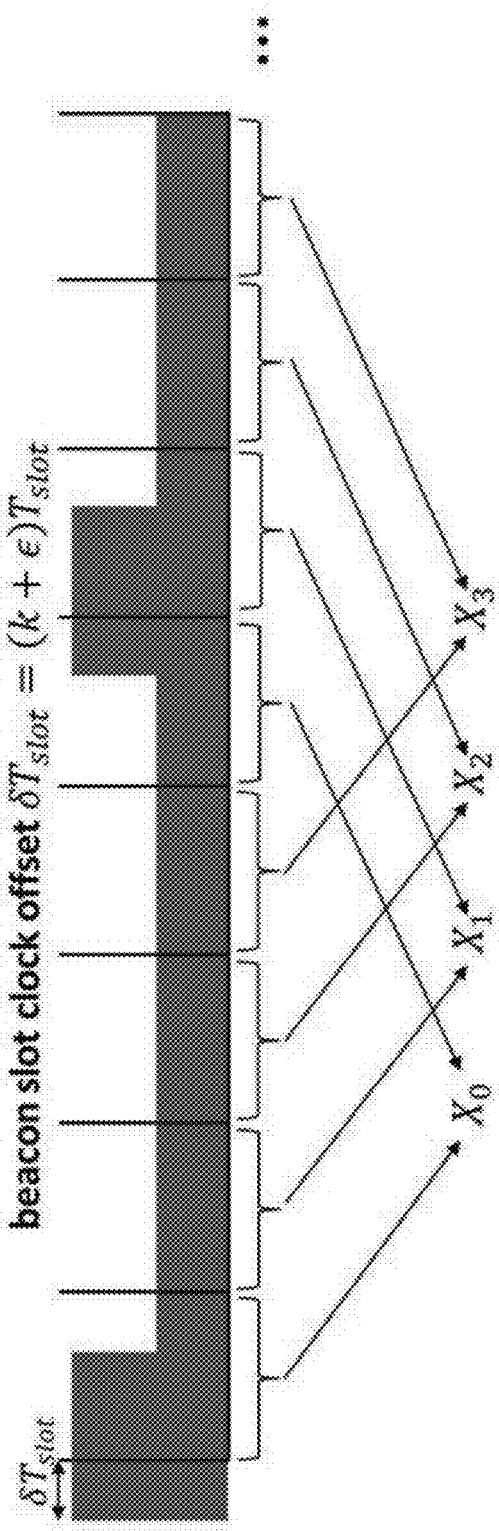
FIG. 12B shows 2-PPM+2-ISGT modulated intensity beacon slot clock offset.

The average transmitted slot intensity is shown in FIG. 12A-12B for the 2-PPM signal with 2 ISGT slots. The flight detector array readout frames are clocked at a multiple of the transmitted slot rate, so that the flight electronics receive multiple samples per transmitted slot. It is assumed that there is a timing offset of $\delta T_{slot} = (k+\epsilon)T_{slot}$ between the transmitted and receiver symbol clocks, where $k \in \{0, 1, 2, 3\}$ and $0 \leq \epsilon < 1$, and that the clocks have no significant frequency offset or drift over the duration that an estimate is made. For any given pixel, the sampled version of the received signal consists of slot counts obtained by summing the number of valid timestamps corresponding to detected photoelectron counts over each slot duration. These counts are then alternately added and subtracted at twice the symbol frequency over N 2-PPM+2-ISGT symbols to form "up-down" counter statistics. This process can be equivalently viewed as accumulating the counts over N 2-PPM+2-ISGT symbols into one of four slot count bins denoted by the statistics $X_0$, $X_1$, $X_2$, and $X_3$. More explicitly, if $\{x(n)\}$ is the series of slot counts, then $$X_m = \sum_{n=0}^{N-1} x(4n+m), \ m \in \{0, 1, 2, 3\}, \quad (3)$$

In the absence of blocking, assuming that k=0, the means and variances of the accumulated slot statistics are $$E[X_0] = \text{Var}[X_0] = N\lambda_b T_{slot} + 2N\lambda_s T_{slot} \quad (4)$$

$$E[X_1] = \text{Var}[X_1] = N\lambda_b T_{slot} + 2N(1-\epsilon)\lambda_s T_{slot} \quad (5)$$

$$E[X_2] = \text{Var}[X_2] = N\lambda_b T_{slot} \quad (6)$$

$$E[X_3] = \text{Var}[X_3] = N\lambda_b T_{slot} + 2N\epsilon\lambda_s T_{slot}, \quad (7)$$

wo up-down counter statistics U and V, offset in quadrature, are calculated for each detector pixel as $$U = X_0 + X_1 - X_2 - X_3 \quad (8)$$

and $$V = X_0 - X_1 - X_2 + X_3 \quad (9)$$

Additionally, an up-counter that simply accumulates all of the counts over N symbols is formed for each pixel, and is denoted by $$S = X_0 + X_1 + X_2 + X_3 \quad (10)$$

For general values of the integer part k of the symbol offset, the expected values of the counter outputs are given by $$E[U] \equiv \mu_1(k, \epsilon, \lambda_s) = \begin{cases} 4N(1-\epsilon)\lambda_s T_{slot} & k=0 \\ -4N\epsilon\lambda_s T_{slot} & k=1 \\ -4N(1-\epsilon)\lambda_s T_{slot} & k=2 \\ 4N\epsilon\lambda_s T_{slot} & k=3 \end{cases} \quad (11)$$

$$E[V] \equiv \mu_2(k, \epsilon, \lambda_s) = \begin{cases} 4N\epsilon\lambda_s T_{slot} & k=0 \\ 4N(1-\epsilon)\lambda_s T_{slot} & k=1 \\ -4N\epsilon\lambda_s T_{slot} & k=2 \\ -4N(1-\epsilon)\lambda_s T_{slot} & k=3 \end{cases} \quad (12)$$

$$E[S] = 4N(\lambda_b + \lambda_s)T_{slot} \ \forall k. \quad (13)$$

In the absence of blocking, the variances of these random variable are all equal to each other, and given by $$\text{Var}[U] = \text{Var}[V] = \text{Var}[S] = 4N(\lambda_b + \lambda_s)T_{slot} \equiv \sigma^2 \quad (14)$$

From (11) and (12), it is observed that the expected values of the two up-down counters U and V are functions of the signal flux $\lambda_s$ but not the background flux $\lambda_b$, and may therefore be used to estimate the position of the signal while the effect of background is mitigated. For ease of analysis, the distribution of U, V, and S is approximated to be Gaussian with the means and variances given above, which is a reasonable assumption for the integration times involved. The indices (i, j) are added to the counter notation to denote the pixel statistic from the i-th column and j-th row of the detector array. It may be shown that conditioned upon the values k, $\epsilon$, $\lambda_{s,i,j}$, and $X_{b,i,j}$, $$\text{Cov}[U_{i,j}, V_{i,j}|k, \epsilon, \lambda_{s_{i,j}}, \lambda_{b_{i,j}}] = 0, \ \forall i,j. \quad (15)$$

Here, $\lambda_{s,i,j}$ and $\lambda_{b,i,j}$ are the mean signal and background fluxes for pixel (i, j). It is also assumed for analytical purposes that equation (15)=

$$\text{Cov}[V_{i,j}, V_{l,m}|k, \epsilon, \{\lambda_s\}, \{\lambda_b\}] = \text{Cov}[S_{i,j}, S_{l,m}|k, \epsilon, \{\lambda_s\}, \{\lambda_b\}] = 0, \quad (16)$$

$$\forall (i, j) \neq (l, m).$$

This last assumption in (16) does not generally hold for real detectors—in practice there is measurable crosstalk between pixels leading to non-zero covariance. Also note that Cov$[U_{i,j}, S_{i,j}]$ and Cov$[V_{i,j}, S_{i,j}]$ are nonzero.

6. Signal Detection and Acquisition

The joint probability density function of the statistics $U_{i,j}$, $V_{i,j}$, and $S_{i,j}$ may be formed using the Gaussian approximations and means and variances given in Section 3.1, and the sufficient statistic for signal detection and parameter estimation may then be derived. As this is mathematically intensive, a heuristic decision statistics obtained from inspection of the expressions in Section 3.1 is used. The statistic $$U_{i,j}^2 + V_{i,j}^2$$

makes intuitive sense given the quadrature nature of the offset up-down counters and the similarities with non-coherent radio frequency carrier envelope detection. However, it may be shown that the expected value of this square-law statistic depends upon the background flux, which would result in a bias in the estimation of the beacon position in the presence of nonuniform background, as well as degradation in signal detection performance. This bias is removed by subtracting twice the up-count output of each pixel from the square-law statistic, leading to the modified square-law statistic $$W_{i,j} = U_{i,j}^2 + V_{i,j}^2 - 2S_{i,j} \quad (17)$$

$$E[W_{i,j}|\epsilon, \lambda_{s_{i,j}}, \lambda_{b_{i,j}}] = \lambda_{s_{i,j}}^2 T_{int}^2 (1 - 2\epsilon + 2\epsilon^2). \quad (18)$$

The variance is more complicated; however, averaging over the fractional timing offset $\epsilon$, we obtain the expression which is a function of higher order powers of the signal as well as background, due to the squaring operation. Further information on signal detection and acquisition is found on pages 7-8 of U.S. Provisional Patent Application No. 62/300,240, filed Feb. 26, 2016, by Kenneth S. Andrews, William H. Farr, Andre Wong, and Meera Srinivasan, entitled "OPTICAL BEACON ACQUISITION AND TRACKING USING UP/DOWN COUNTING ALGORITHMS" and cross-referenced above.

During uplink beacon detection and acquisition, the spacecraft pointing uncertainty region is scanned to detect the signal. Using an estimate of the background obtained beforehand to compute the threshold, the signal detection statistic Z k is calculated for all of the subwindows of the array. The size and number of subwindows may be adjusted based upon the background level, required performance, and flight electronics processing capability. A simple alternative algorithm consists of calculating the modified square-law statistic for each individual pixel, finding the maximum, and comparing that value to the threshold y calculated for a single pixel.

7. Centroiding

In order to estimate the location of the uplink signal for the purpose of pointing and tracking, a centroid estimate is used in which the weight used for each pixel may be either the up-count statistic $S_{i,j}(k)$ or the modified square-law up-down counter statistic $W_{i,j}(k)$, where the indices i, j, and k, indicate the pixel in the $i^{th}$ row and $j^{th}$ column of the particular subwindow k. The uplink centroid estimate $$\hat{C}(k)=(\hat{x}(k),\hat{y}(k)),$$

using the modified square-law up-down counter statistic, is calculated as $$\hat{x}(k) = \frac{\sum_{j=0}^{N_{cols}-1}(j+0.5)\sum_{i=0}^{N_{rows}-1}W_{i,j}(k)}{\sum_{j=0}^{N_{col}-1}\sum_{i=0}^{N_{rows}-1}W_{i,j}(k)} \quad (24)$$

$$\hat{y}(k) = \frac{\sum_{i=0}^{N_{rows}-1}(i+.05)\sum_{j=0}^{N_{col}-1}W_{i,j}(k)}{\sum_{j=0}^{N_{col}-1}\sum_{i=0}^{N_{rows}-1}W_{i,j}(k)}$$

where $N_{col}$ and $N_{rows}$ are the number of columns and rows in the subwindow, and $\hat{x}$ and $\hat{y}$ are given in pixel units. The conventional centroid estimate using the up-counts may be obtained by substituting the statistics $S_{i,j}(k)$ for $W_{i,j}(k)$ in (24). The performance of the centroid estimate may be evaluated via simulation and quantified as centroiding bias and jitter (RMS error).

Once the uplink beacon has been detected, the centroid formula in (24) is calculated over a specified size subwindow in order to steer the platform to move the beacon to the pixel crosshairs of a designated tracking region. At that point, the subwindow size is reduced to eliminate background, and the beacon centroid estimate is used to maintain the uplink beam position so that temporal synchronization and data demodulation may commence. The downlink transmitter may then be turned on and pointed using the uplink beacon reference position and ephemeris data provided by the spacecraft. The downlink pointing in confirmed by splitting off a portion of the transmitted beam power to be retro-reflected onto the detector array so that its position may also be estimated. As the downlink modulation occurs at a much higher rate than may be processed by the flight detector readout electronics, up-down counting background subtraction cannot be used for downlink detection. Instead, the conventional centroid estimate using the up-counts is used to estimate and track the downlink spot position. As the downlink signal is expected to be in a location of the detector array separated from the uplink beacon and the Earth, the inventors do not expect in-band background to interfere as much with its tracking. Furthermore, a degree of control over how much power may be diverted into the retro-reflected downlink is available, and it may be adjusted to achieve the fidelity of downlink tracking that we require.

8. Parameter Estimation

Estimates of certain signal and channel parameters are typically necessary for accurate data recovery. Slot and symbol synchronization utilizes estimates of the symbol timing offset δ in an error-tracking timing recovery loop. As forward error correction is applied to the uplink command data, the decoding of that data requires an estimate of the mean signal and background flux rates in order to form decoder log-likelihood ratios. [8] Once in uplink tracking mode, the beacon signal is restricted to a small tracking subwindow ω t, and the process of uplink timing and data recovery may proceed. The up-down counter values over the pixels in $\omega_t$ must be added in order to collect the combined signal power which is split over at least four pixels. The summed up-down counter statistics are given by $U_t=\Sigma_{i,j\in\omega_t}U_{i,j}$ and $V_t=\Sigma_{i,j\in\omega_t}V_{i,j}$. Examination of the up-down counter expected values in (11) and (12) leads to the following plausible estimates for the symbol timing offset δ and the mean signal counts per symbol $K_s=4\lambda_s T_{slot}$:

$$\hat{\delta} = \begin{cases} \frac{V_t}{U_t+V_t} & U_t>0, V_t>0 \\ 1+\frac{U_t}{U_t-V_t} & U_t<0, V_t>0 \\ 2+\frac{V_t}{U_t+V_t} & U_t<0, V_t<0 \\ 3+\frac{U_t}{U_t-V_t} & U_t>0, V_t<0 \end{cases} \quad (25)$$

$$\hat{K}_s = \begin{cases} \frac{1}{N}(U_t+V_t) & U_t>0, V_t>0 \\ \frac{1}{N}(-U_t+V_t) & U_t<0, V_t>0 \\ \frac{1}{N}(-U_t-V_t) & U_t<0, V_t<0 \\ \frac{1}{N}(U_t-V_t) & U_t>0, V_t<0 \end{cases} \quad (26)$$

where N is the number of symbols or beacon cycles over which the up-down counters are collected.

9. Performance Results

Simulation

Performance of the signal detection, centroiding, and parameter estimation algorithms was evaluated through a combination of analysis, computer simulation, and laboratory testing. Of these methods, computer simulation provides the most flexible method of parametrically predicting performance. Toward these ends, a Matlab simulation was developed encompassing uplink signal modulation, Earth and stray light modeling, flight detector statistical output modeling, and signal processing algorithms, as shown in FIG. 13.

Figure 13:
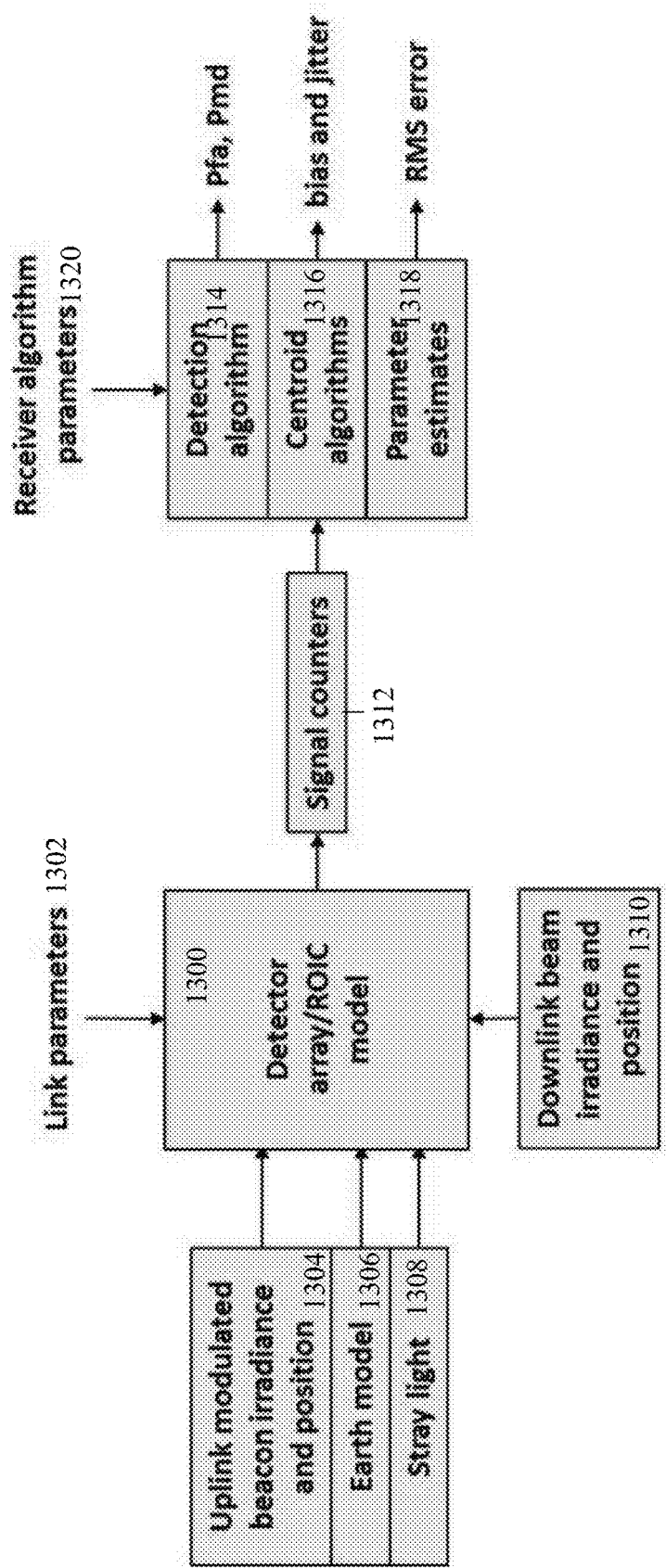
FIG. 13 shows a block diagram of Matlab uplink signal processing simulation.

FIG. 13 shows a block diagram of Matlab uplink signal processing simulation comprising a detector array/ROIC model 1300 receiving input from link parameters 1302, uplink modulated beacon irradiance and position 1304, earth model 1306, stray light 1308, and downlink beam irradiance and position 1310. The detector array ROIC model 1300 outputs to signal counters 1312 and the signal counters 1312 output to algorithms comprising a detection algorithm 1314 (outputting Pfa, Pmd), centroid algorithms 1316 (outputting bias and jitter), and parameter estimates 1318 (RMS error). The algorithms receive input from receiver algorithm parameters 1320.

The simulation includes an ideal two-dimensional Gaussian approximation to the Airy signal intensity pattern on the detector array, as well as a numerically integrated model of the Earth whose shape can be adjusted based upon the angle of illumination from the Sun. The detector pixels are assumed to collect the incident photons over the full extent of the array, but a spatial model of the lenslet array is not included. In the worst case, the spacecraft is at far range, leading to very low signal flux at the spacecraft, and the Earth is fully illuminated from the spacecraft point-of-view. A case in which the uplink beacon is 5 kW average power and the spacecraft is 2.7 AU from the Earth is modelled, leading to a detected beacon signal count rate of approximately 25, 000 counts/sec/pixel (limited to about four pixels), and a detected Earth background count rate of approximately 100, 000 counts/sec/pixel, assuming the parameters listed in Table 1.

Figure 14A:
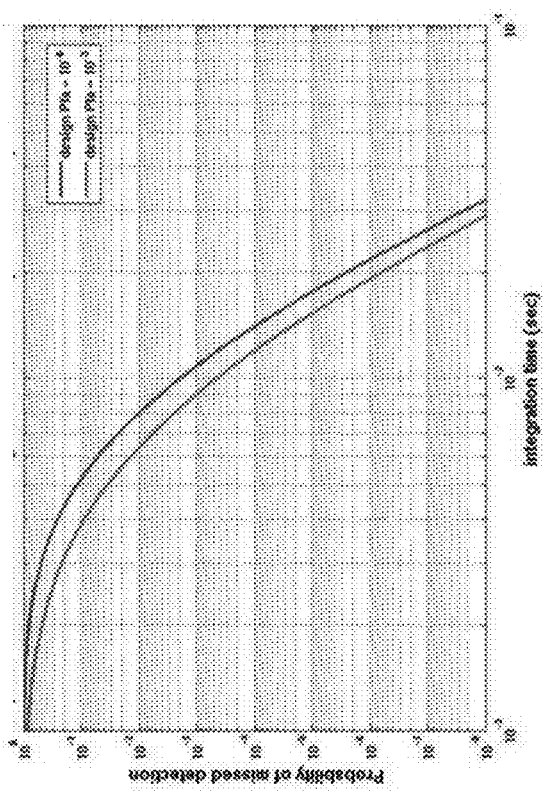
FIG. 14A and FIG. 14B show the probability of missed detection for the uplink beacon signal as a function of integration time in seconds (FIG. 14A), and background flux over detector array in counts per second (FIG. 14B), wherein the signal flux is 125000 counts per second (~4.6 pW/m$^2$ beacon irradiance at the flight terminal) with 0.0087 cm$^2$ sr micron earth radiance.
Figure 14B:
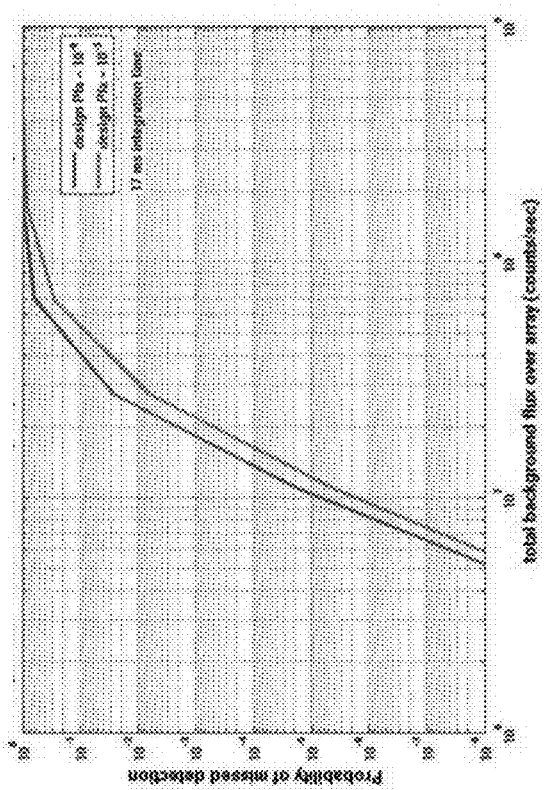

The performance of the signal detection algorithm and decision statistic may be obtained by testing the probability of false alarm and probability of missed detection via a Monte Carlo simulation in which a signal is repeatedly placed either within a subwindow or outside of it, and the resulting decision statistic is computed and then compared to the appropriate threshold given in (22). FIG. 14A-14B shows the probability of missed detection using the modified square-law statistic as a function of integration time and background flux for probability of false alarm set to $10^{-6}$ and $10^{-3}$, for the link parameters listed in Table 1. We observe from these plots that an integration time on the order of 20 ms per search step is sufficient to reliably detect the beacon when the background flux (dominated by Earth radiance) is on the order of $10^7$ detected counts/sec. Once the background flux starts exceeding this level, longer integration times are needed, increasing the overall acquisition time. The effect of blocking was not considered in these particular simulations of the missed detection probability.

TABLE 1

Parameters used in uplink simulation and testing

| Paramater | value |
|---|---|
| uplink wavelength | 1.064 µm |
| range | 2.7 AU |
| average beacon power | 5 kW |
| beacon irradiance | 4.6 pW/m² |
| Earth radiance | 0.0087 pw/(cm² · sr · µm) |
| stray light radiance | 8.7 × 10⁻⁵ pw/(cm² · sr · µm) |
| modulation extinction ratio | 20 dB |
| beacon/command channel slot width | 65.536 µsec |
| aperture diameter | 22 cm |
| filter bandwidth | 1 nm |

TABLE 1-continued

Parameters used in uplink simulation and testing

| Paramater | value |
|---|---|
| receiver optical loss | 3.24 dB |
| detector fill factor | 75% |
| array size | 32 × 32 |
| pixel field-of-view | 250 µrad |
| detection efficiency | 40% |
| detector pixel dark flux | 8000 counts/sec/pixel |
| detector blocking time | 2.048 µsec |

Figure 15B:
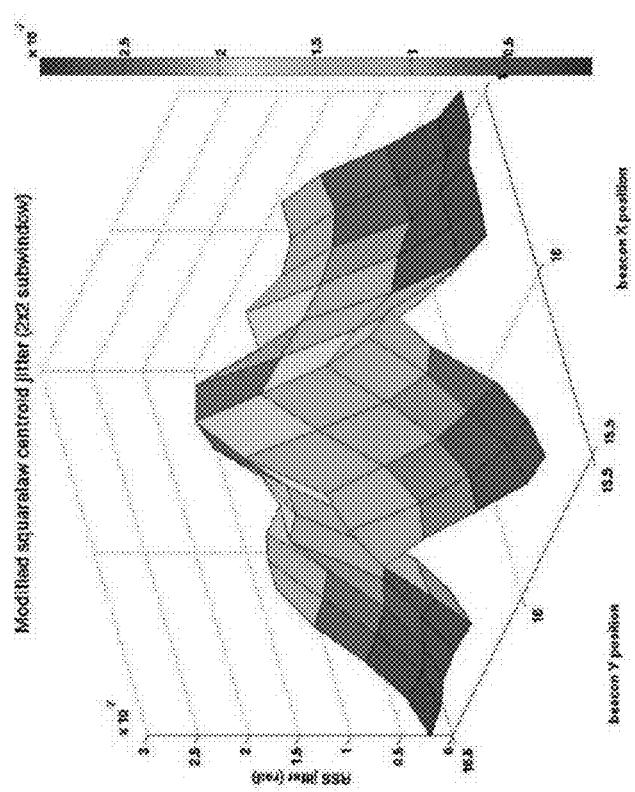
FIG. 15A and FIG. 15B show analytically calculated uplink centroid estimation error using modified square-law statistics in the absence of detector blocking, shown as a function of beacon position within ±0.5-pixel of tracking subwindow crosshairs: RSS bias (FIG. 15A) and RSS jitter (FIG. 15B)
Figure 15A:
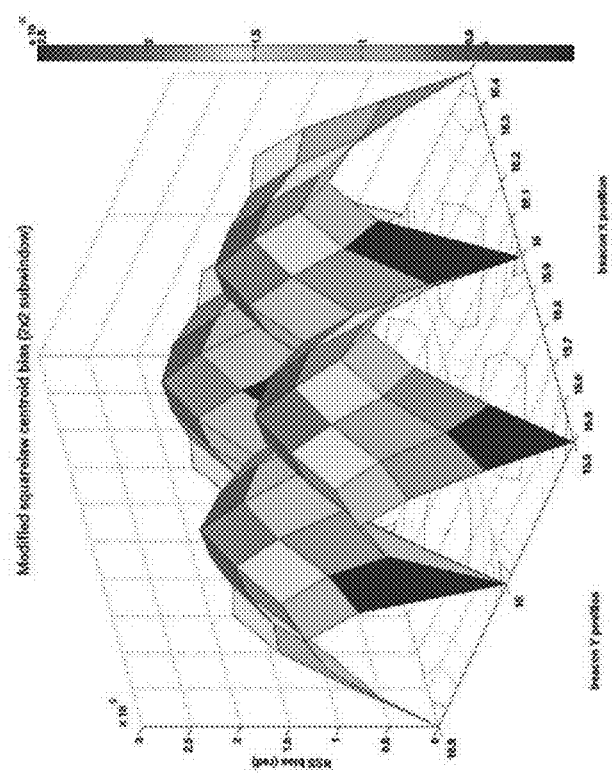

Performance evaluation of uplink beacon centroiding is critical, as the error in knowledge of the beacon position is a dominant contributer to the downlink pointing error and, consequently, the downlink losses. The centroid error consists of both bias and jitter components, which we measure through Monte Carlo simulation under a variety of conditions, including different beacon positions within ±0.5 pixel from the crosshairs of a 4×4 centroiding subwindow located at the center of the detector array. The beacon is offset from the center of the full Earth, so that the Earth center-of-mass is not coincident with the beacon location. FIG. 15A-15B shows the expected values of the modified square-law centroid algorithm root-sum-square (RSS) bias and jitter as a function of the X and Y beacon positions, in the absence of blocking. We see that the RSS bias is symmetric and that its expected value is zero at the crosshairs and centers of pixels, due to the spatial symmetry of the signal model. Conversely, the RSS jitter is maximum at the pixel crosshairs. The jitter is also not symmetric because the beacon is offset from the Earth center, whose flux contributes to the centroid jitter via the modified square-law statistic variance, but not to the centroid bias which depends upon the expected value of the modified square-law statistic.

Figure 16A:
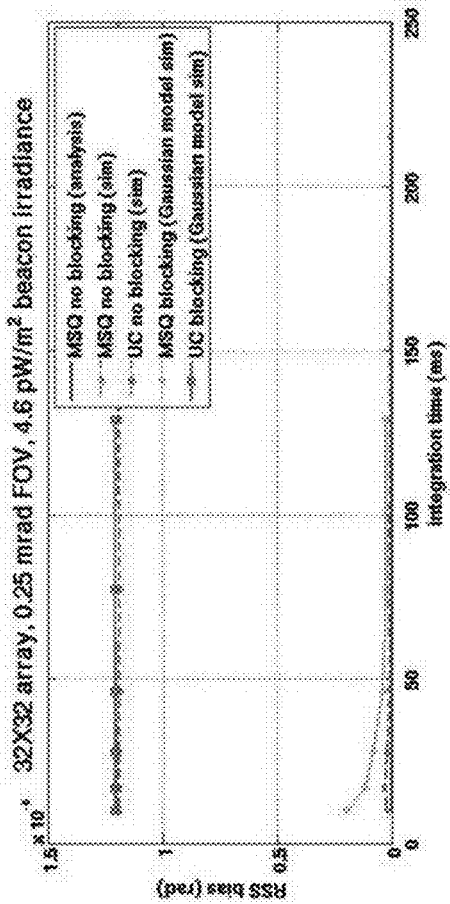
FIG. 16A-16B shows RSS bias and jitter as a function of integration time for modified square-law and up-count beacon centroiding, with and without blocking (FIG. 16B)
Figure 16B:
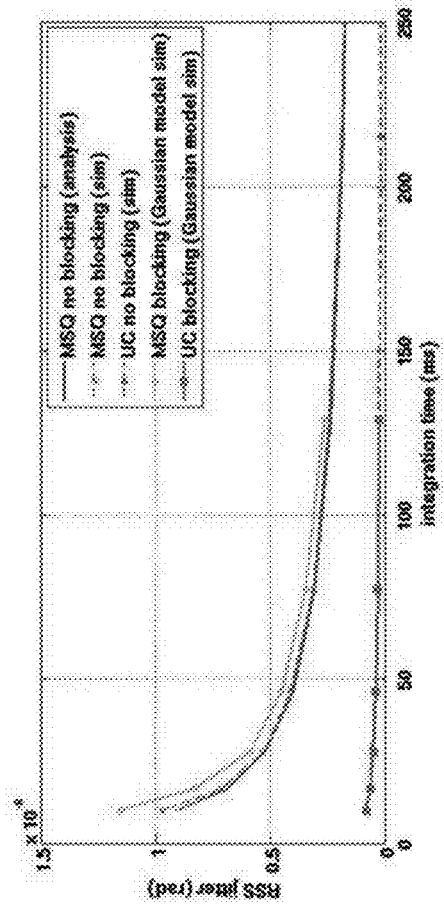

In FIG. 16A-16B, uplink beacon centroiding simulation results are shown when the beacon is positioned at the pixel crosshairs, with and without detector blocking, as a function of integration time (the time over which the centroiding statistics are collected). The Gaussian blocking model described in Section 2.2 is implemented in the simulation. When the performance of the modified square-law centroid is compared with that of the conventional up-count centroid. It is again seen that the modified square-law centroid outperforms the up-count centroid in terms of bias but not jitter. It is also seen that for this case blocking affects the modified square-law centroid more than the up-count centroid, increasing the error terms by 0.1 to 0.2 µrad at lower integration times. However, even with blocking, the total centroid error (bias plus jitter) using the modified square-law statistic is within 1 µrad for integration times longer than about 17 ms (less than 60 Hz update rates).

Figure 17A:
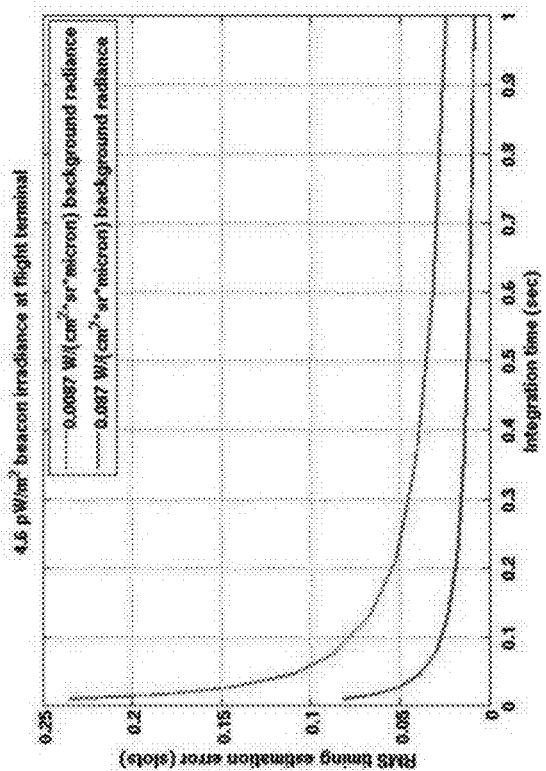
FIG. 17A-17B show RMS fraction estimation error as function of integration time slot timing offset (FIG. 17A), and signal counts per symbol (FIG. 17B)
Figure 17B:
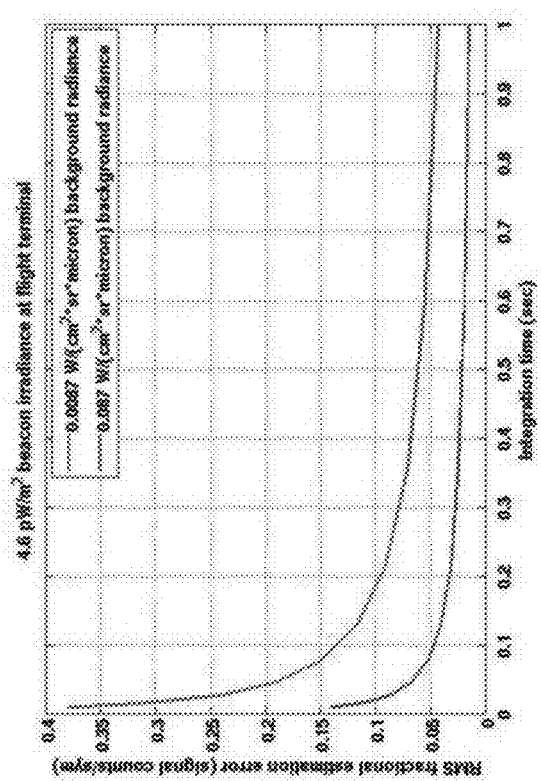

The accuracy of the symbol timing offset and signal count estimates given in (25) and (26) was also evaluated via simulation as a function of integration time for the parameters in Table 1. A typical rule-of-thumb for minimal decoder loss is to achieve an RMS timing error of less than 0.1 slot. FIG. 17A-17B shows that this level of error is easily achieved at integration times of greater than 10 ms for the nominal background radiance level. When the background radiance is increased by an order of magnitude, this level can be achieved by increasing the integration time. Similarly, under nominal conditions, the mean signal count may be estimated to a less than 10% error for integration times of 20 ms or longer.

10. Laboratory Tests

The DSOC photon counting camera testbed is designed to emulate the channel conditions under which the flight terminal is expected to operate. By mimicking the signal and detector configuration, the testbed provides parametric test capability of both the photon counting detector array and the signal processing algorithms described here. The testbed projects a modulated 1064 nm laser simulating the DSOC uplink laser, a CW 1550 laser simulating the DSOC downlink laser, and a white light background source onto the photon counting camera (see block diagram in FIG. 13). A commercial photon counting detector (PCD) array hybridized to a readout integrated circuit [6] was used in the results presented here. The photon counting array consists of 1024 pixels arranged in a 32×32 grid with 100 μm spacing, each pixel having a circular 16 μm diameter photosensitive region.

Between both the 1064 nm and 1550 nm laser sources and the photon counting camera are optics designed to provide adjustability to the projected laser spots. The optics are designed to project a spot size of approximately 4 pixels (2×2) for a 100 nm pixel pitch design for the photon counting camera to emulate the design expectations for the DSOC flight terminal. These optics may be changed as needed to adjust the spot size. Filter wheels with neutral density attenuators provide order-of-magnitude control of flux levels from each of the sources, while fine tuning of flux levels is achieved by adjusting the connections of the laser fiber coupling. Kinematically mounted fold mirrors allow for relative spot positioning between the two lasers on the PCC image plane.

The 1550 nm laser is a continuous source, while the 1064 nm laser is connected to a modulator. The modulator is driven by a set of FPGA-based electronics which implements the uplink beacon signal format described in Section 2.1. The background source contains a variable output LED for adjusting flux levels. Additionally, a pinhole can be placed in front of the LED source in order to project an Earth-sized spot on the image plane. A dichroic combines the background earth projection and the 1064 nm laser source as would be seen by the DSOC flight terminal during operation. Finally, the detector array is mounted to a computer-controlled X-Y positioner stage which provides sub-pixel translation, needed to investigate the effects of spatial nonuniformities in the detector array on the performance of the algorithms as well as intrapixel effects.

The photon counting camera used in the laboratory has a 32×32 array of avalanche photo-diodes (APDs), co-packaged with a read-out integrated circuit (ROIC). The ROIC manages the biasing and quenching requirements of the APDs, and records photon arrival times at each of the pixels to 1 nsec accuracy. For the low data rates used in this experiment, such timing accuracy is not necessary, so a second set of ROIC outputs is used that reports photon arrivals over approximately 2 μsec intervals.

These data are transferred from the ROIC to a Field Programmable Gate Array (FPGA), where the initial data reduction is performed. The high-speed portions of four algorithms are implemented in Verilog: two for performing centroiding on the modulated uplink beacon (one at an unknown location anywhere on the array, and the second at a known location), one for demodulating the received uplink data, and one for centroiding on the downlink laser signal.

During uplink beacon acquisition, the received laser spot may appear anywhere on the detector array. Hence, the modified square-law statistic given by equations 8 through 10 and 17 is computed at a 60 Hz rate for every pixel in the array. In the hope that the beacon centroid lies close to the pixel for which is greatest, this pixel is taken as the center of a 3×3 window, and the centroid is calculated using 24. For convenience in implementation, the FPGA computes the numerators and the common denominator of these fractions in 32-bit integer arithmetic, and passes these values to a microprocessor, where the division operations are performed by C-language software. It is also the responsibility of the software to validate the centroid estimate based on the magnitude of the centroid denominator, and on the consistency of the centroid estimate over time.

After beacon acquisition, better performance of the centroid algorithm can be achieved by placing the beacon spot near the crosshairs between four pixels. The advantages are several. First, as shown in FIG. 12, the algorithm is most sensitive to spot motion on the pixel boundaries, due in part to the algorithm itself and in part to the geometry of the photosensitive area of each pixel. Second, this spot placement allows the use of a 2×2 window instead of a 3×3 window, thus collecting fewer background photons. Third, it permits selecting a particular 2×2 window, where the pixels have particularly good detection efficiency and low dark count rate. For these reasons, a second beacon centroiding algorithm is implemented in the FPGA, and it performs the same centroiding calculations in 17 and 24, but over a specific 2×2 window as specified by the microprocessor.

Rather than pointing the downlink laser directly at the location of the uplink beacon, a point-ahead angle is included to allow for motion during the round-trip light time. To permit closed-loop control of this point-ahead angle, a small portion of the downlink laser signal is redirected onto the APD array, and the centroid of this spot is computed as well. The modulation rate of the downlink laser is far faster than 2 μsec rate at which the APD is monitored, and so it appears as an unmodulated spot. Hence, the downlink centroiding algorithm can only use the sum statistic of 10. During downlink transmission, the uplink beacon spot is driven to a pixel crosshair, and the point-ahead angle is known, and so the location of the downlink laser spot is also known to the open-loop accuracy of the point-ahead mirror. Thus, the downlink centroiding algorithm uses a 3×3 window at a location specified by the processor.

Finally, the optical uplink data is also detected by the PCC and demodulated by the FPGA. As described above, detected counts from the PPM-modulated signal are summed over the four pixels in the specified 2×2 tracking window. Slot timing is determined by a tracking loop that consists of an error function related to the symbol timing offset estimate given in 25 and a low-pass filter. In this way, the FPGA reports the number of photons detected in the two PPM slots of each symbol. These slot statistics are simply stored for later analysis and processing in this implementation. In a future implementation, it is intended that they would be drive a soft-symbol decoder for the underlying error correcting code.

Figure 20B:
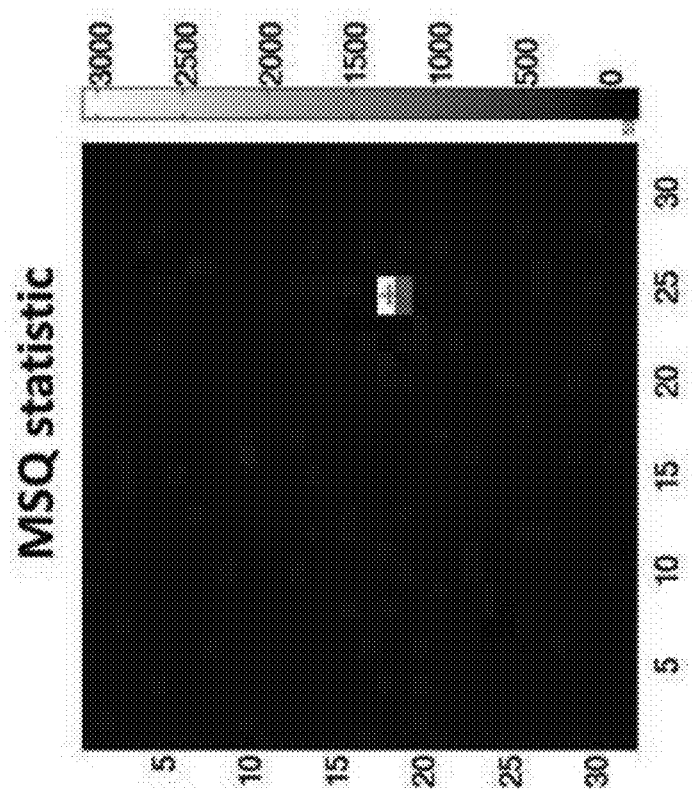
FIG. 20A-20B shows a 32×32 detector array FPGA output with uplink beacon, downlink signal, and Earth emulation, showing total detected counts over 17 ms (FIG. 20A) and modified square-law statistics over 17 ms (FIG. 20B)
Figure 20A:
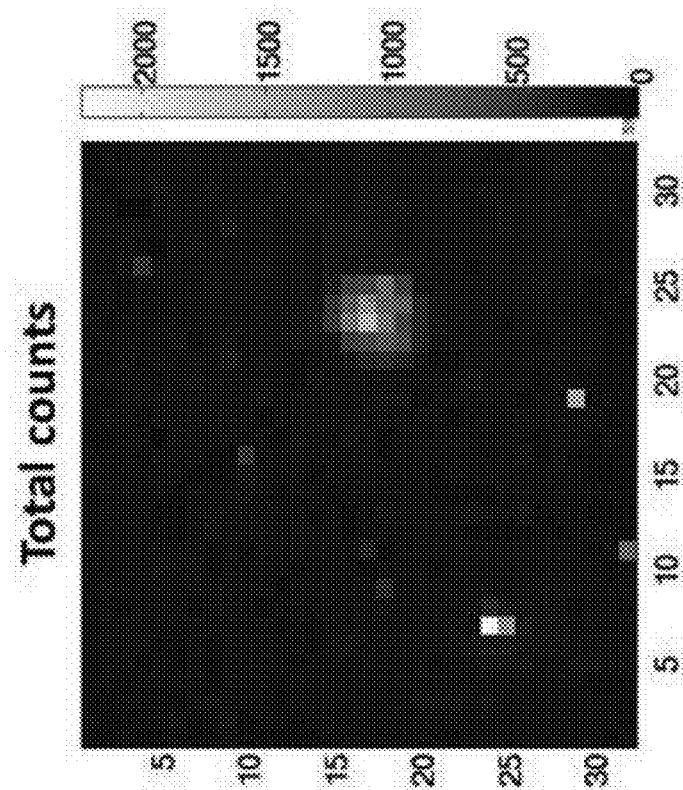

For the laboratory test results presented here, the beacon laser spot was displaced from the center of the emulated Earth by approximately one pixel in each of the X and Y dimensions, representing a case in which the uplink transmitter station location is offset from the center of the full Earth when seen from the spacecraft. FIG. 20A-20B shows images captured from a single 60 Hz output from the FPGA processing described above. FIG. 20A is the up-count output, showing the Earth image with the beacon spot, the downlink spot, and other variations in pixel output levels due to dark counts, stray light, etc. (including a "hot" pixel).

FIG. 20B is the modified square-law output, which has effectively mitigated the background and reveals only the 2×2 uplink beacon.

Figure 18:
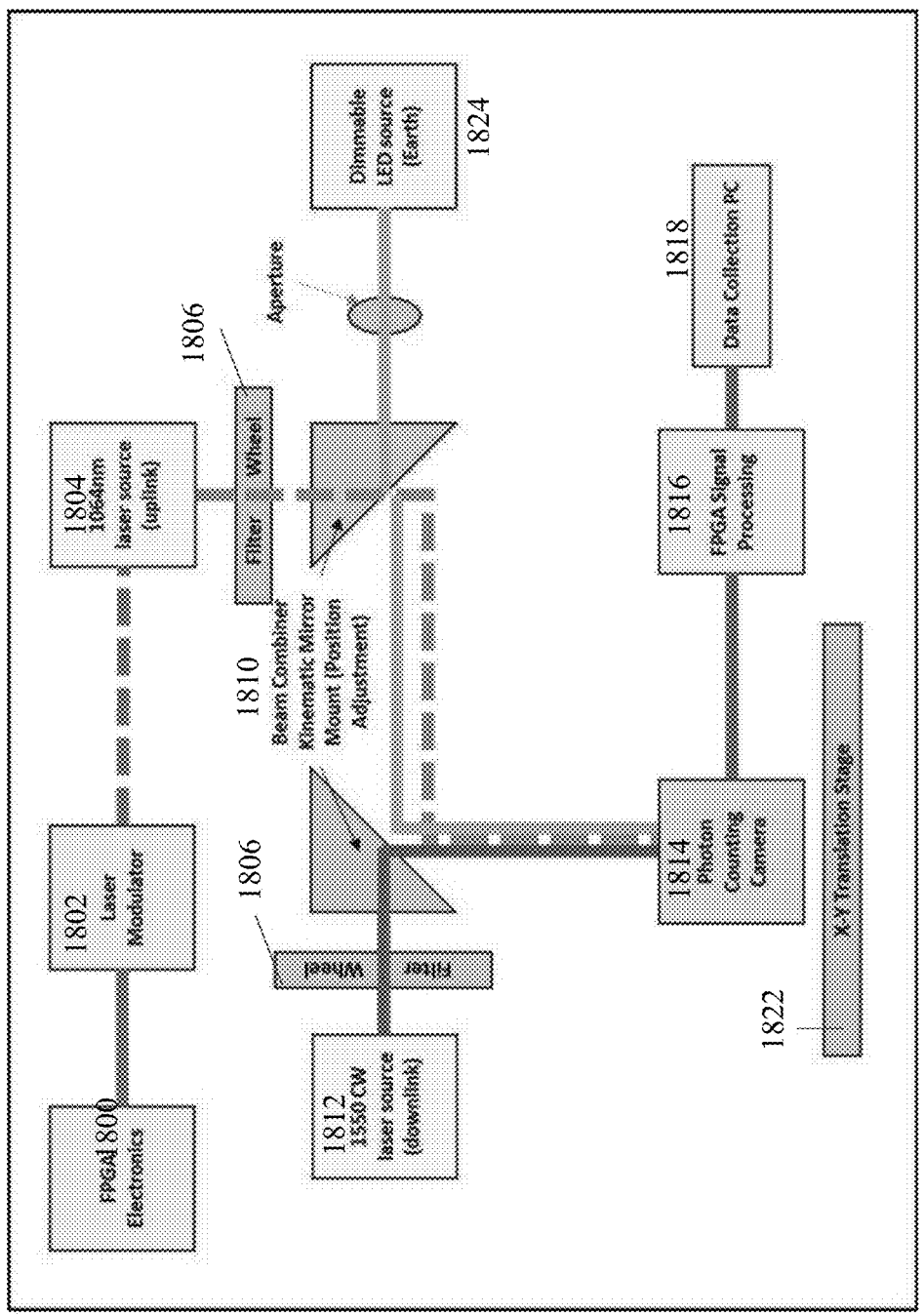
FIG. 18 shows a laboratory photon counting detector array testbed.
Figure 19:
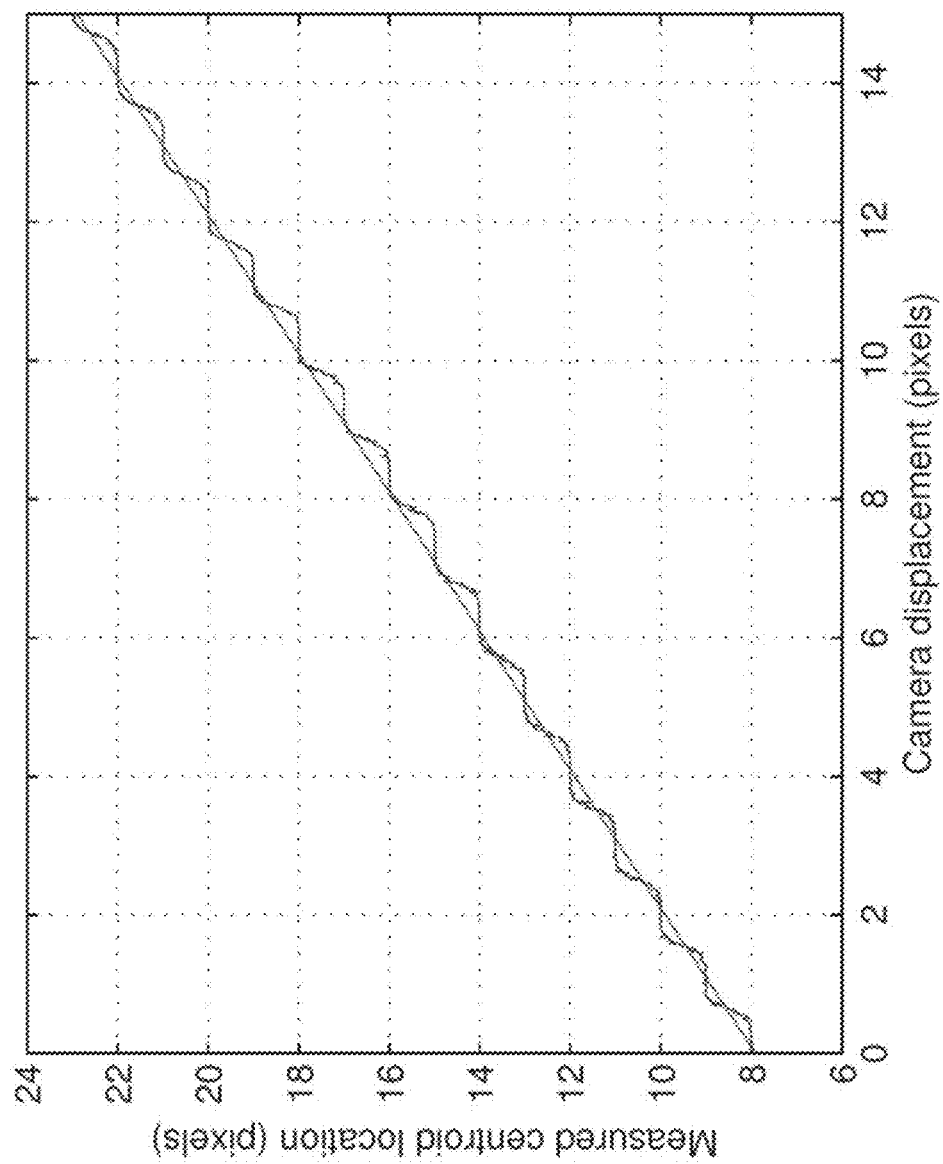
FIG. 19 shows measured centroid X-coordinate vs. uplink spot displacement across detector array.

FIG. 18 shows a laboratory photon counting detector array according to one or more embodiments, comprising FPGA electronics 1800, laser modulator 1802, laser source 1804 (uplink, 1064 nm wavelength), filter wheel 1806, beam combiner kinematic mirror mount (position adjustment) 1810, continuous wave CW laser source 1812 for the downlink (1550 nm wavelength), photon counting camera 1814, FPGA signal processing 1816, data collection personal computer (PC) 1818, aperture 1820, X-Y translation stage 1822, and dimmable LED source 1824 representing the earth.

Figure 21B:
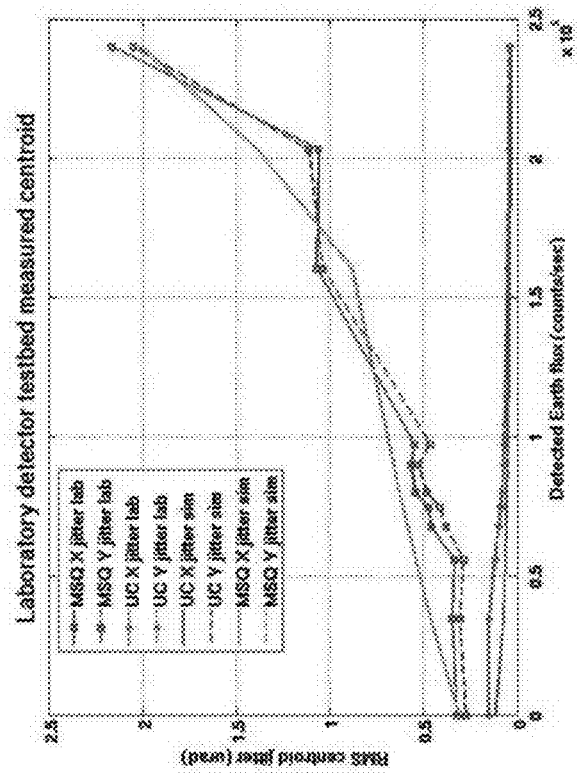
FIG. 21A shows position estimate in pixels and FIG. 21B shows RMS jitter in ura.
Figure 21A:
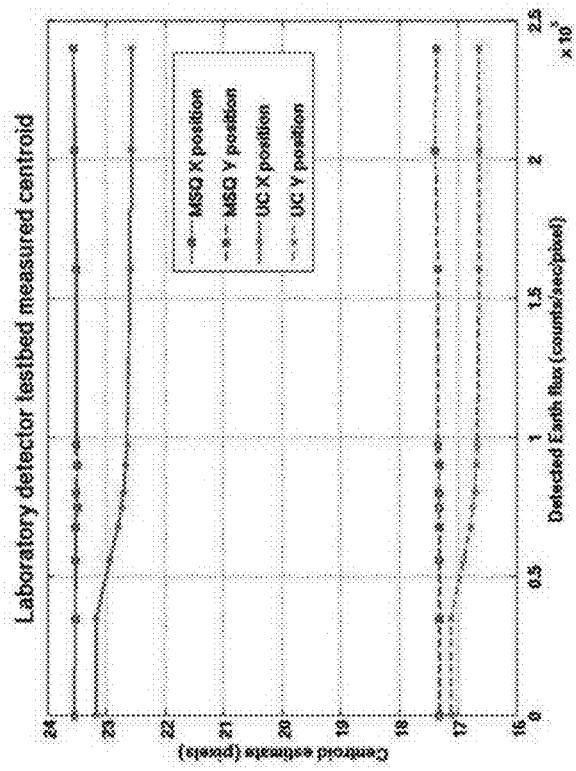

Using the setup shown in FIG. 18 and the spatial configuration shown in FIG. 20, the uplink and down-link centroids were calculated with different levels of Earth flux, ranging from zero up to 240,000 detected counts/sec/pixel. The uplink beacon flux and downlink flux were held constant at approximately 100,000 counts/sec and 200,000 counts/sec, respectively. FIG. 21A-21B shows the mean and RMS jitter values for the up-link centroid estimates as a function of the estimated Earth flux, for centroid calculations using the modified square-law statistics and the up-count statistics. From FIG. 21A, we see that the mean estimated position from the up-count centroid shifts in value as the Earth flux increases, while the modified square-law centroid position remains constant. This demonstrates that the modified square-law centroid estimate is not biased by the Earth background. FIG. 21B shows the RMS jitter as a function of Earth flux. The up-count centroid jitter decreases with Earth background due to the increase in total flux, while the modified square-law centroid jitter increases. Simulations were run for the conditions under which these lab tests were conducted. The Gaussian blocking model was used in the simulation when the Earth flux exceeded $1.5 \times 10^5$ counts/sec/pixel, while the Poisson model was used in the lower flux cases. The simulated performance shows reasonable correspondence with the measured results, which demonstrate the impact of blocking upon centroid jitter. Plots of downlink centroid results are not shown here, but were measured to be stable and constant, with the jitter not exceeding 0.1 μrad.

Further information on one or more embodiments of the photon counting detector array can be found in reference [10].

Process Steps

Transmitter

Figure 22:
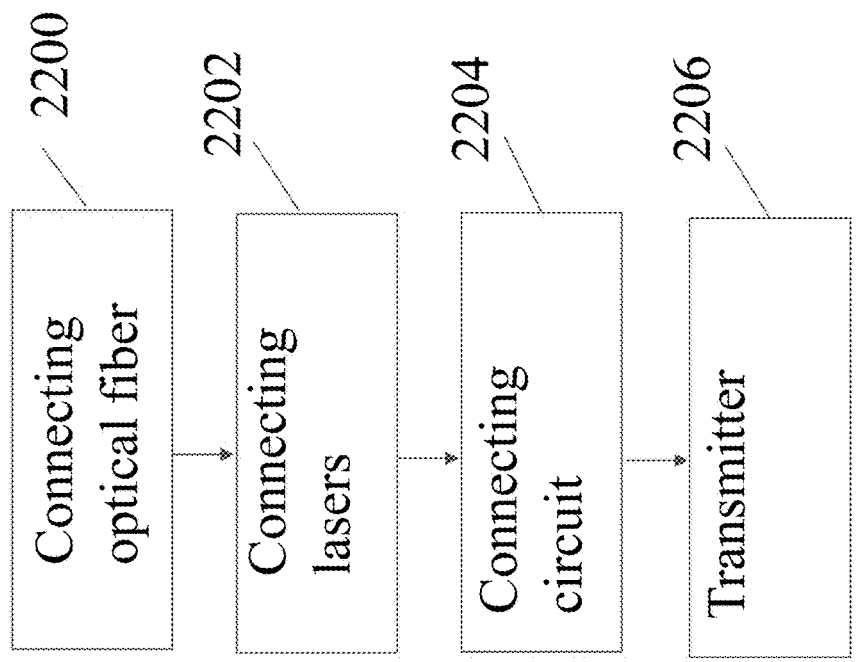
FIG. 22 illustrates a method of fabricating a transmitter.

FIG. 22 illustrates a method of fabricating a transmitter.

Block 2200 represents connecting a fiber optic coupler to a polarization maintaining optical fiber. The fiber optic coupler comprises a first coupler input, a second coupler input, and a coupler output. The coupler output is coupled to the optical fiber comprising a polarization maintaining optical fiber having a slow axis and a fast axis.

Block 2202 represents connecting a first laser to the first coupler input, wherein a first polarization axis of light emitted from the first gated laser is aligned to the slow axis. The step further comprises connecting a second laser to the second coupler input, wherein a second polarization axis of the second laser is aligned to the fast axis.

Block 2204 represents obtaining/assembling a circuit comprising first input, a second input, a third input, a fourth input, a first output and a second output.

Block 2206 represents the end result, a transmitter, e.g., as illustrated in FIG. 4. In one or more embodiments, the first laser and the second laser are gain switched diode lasers.

In one or more embodiments, the transmitter emits short laser pulses, or pulse widths are reduced. In one or more embodiments, the transmitted signal having short/reduced pulse widths aids the receiver to detect the transmitted signal over the noise.

Receiver

Figure 23:
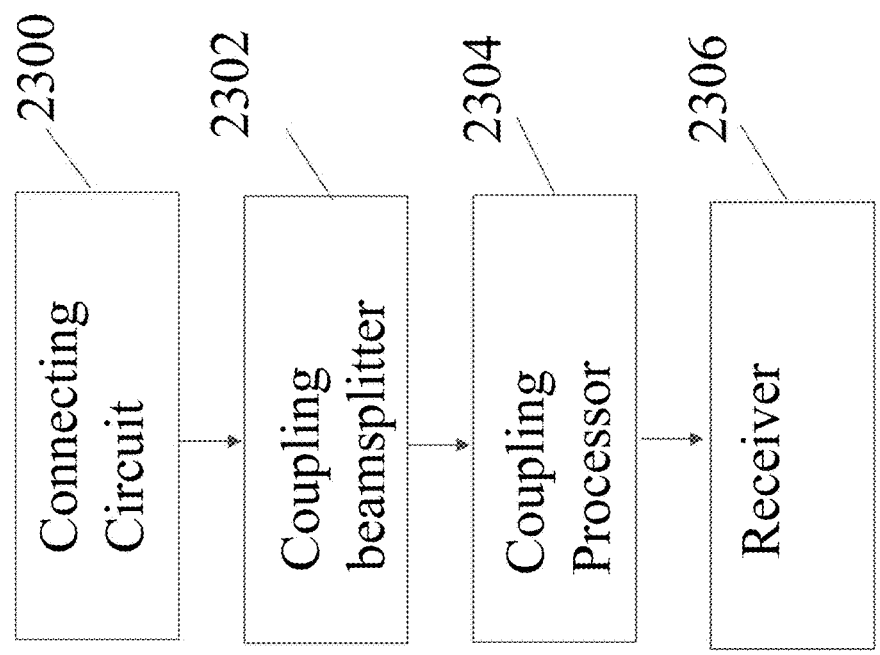
FIG. 23 illustrates a method of fabricating a receiver.

FIG. 23 represents a method of fabricating and operating a receiver.

Block 2300 represents assembling/obtaining a circuit comprising a first photodiode connected to a non-inverting output; and a second photodiode connected to an inverter, wherein the inverter comprises an inverting output.

In one or more embodiments, the photodiodes comprise Geiger mode avalanche photodiodes.

In one embodiment, the first photodiode connected to a first transformer having a first input winding inductively coupled to first output winding, the first output winding connected to the non-inverting output; and the second photodiode connected to a second transformer having a second input winding inductively coupled to a second output winding, the second output winding having an inverting output connected to the non-inverting output. In one or more embodiments, the transformers are substantially similar/the same. In one or more embodiments, the transformers have a similar/same number of windings.

The step further comprise providing a bias input resistively coupled to the photodiodes; and providing an overbiasing input capacitively coupled to the photodiodes. In one or more embodiments, the photodiodes are biased in parallel from a common voltage source through independent current limiting resistors, the bias inputs are connected to the photodiode's cathodes, the bias voltages are below the breakdown voltages, the overbias voltage comprises pulses from a common pulsed source applied to the photodiodes through parallel AC coupling capacitors, the windings each having a first terminal (1) and a second terminal (2) the first input winding having its first terminal connected to the first photodiode's anode and its second terminal grounded, the second input winding having its first terminal connected to the first photodiode's anode and its second terminal grounded, the first output winding having its first terminal grounded and its second terminal connected to the non-inverting output, the second output winding having its first terminal connected to the inverting output and its second terminal grounded, a photon detection event on the first photodiode creates a positive going pulse, whereas a photon detection event on the second photodiode creates a negative going pulse, and simultaneous photon detection events on each of the photodiodes are at least partially canceled, creating no detectable output at the output.

A driver circuit may be provided to drive the gain switched laser diodes using the output from the logic circuit.

The circuit output is connected to the non-inverting output and the inverting output.

In one or more embodiments, an array of pixels is provided, wherein each pixel comprises the first photodiode and the second photodiode.

Block 2302 represents coupling a polarizing beamsplitter to the photodiodes, the polarizing beamsplitter splitting the first electromagnetic signal and the second electromagnetic signal emitted from a single laser (e.g., in a transmitter). The first photodiode is coupled to a first polarizer transmitting the first electromagnetic signal to the first photodiode having a first polarization. The second photodiode is coupled to a second polarizer transmitting the second electromagnetic signal to the first photodiode having a second polarization. In one or more embodiments, the first electromagnetic signal comprises a data signal representing the first binary state in a data stream, the second electromagnetic signal comprises a data signal representing the second binary state in a data stream, and the data stream comprising the first binary state and the second binary state is extracted from the output of the receiver.

Block 2304 represents connecting a computer or processor for extracting the data stream from the output.

Block 2306 represents the end result, a receiver. In one or more embodiments, the overbias voltage comprises pulses having a repetition rate of the electromagnetic signals emitted from the laser. A required phase alignment between that rate and the timing of the gates of the detectors is provided. One embodiment sweeps through all phases until a signal is detected.

In one or more embodiments, the transmitted signal is obtained by performing a time domain correlation of the received signal (e.g., Fourier transform) and selecting the signal that is above a certain threshold.

In one or more embodiments, the receiver is connected in an optical communications data link comprising a transmitter (including, but not limited to, a transmitter as described herein) and the receiver receiving the electromagnetic signals from the transmitter.

Counting Detector

Figure 24:
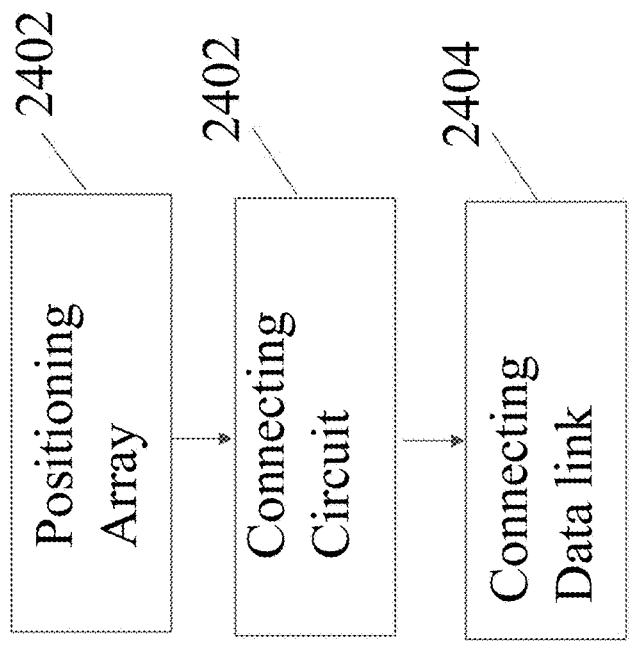
FIG. 24 illustrates a method of fabricating a photon counting detector.

FIG. 24 illustrates a method of fabricating a camera.

Block 2400 represents obtaining an array of imaging pixels.

Block 2402 represents fabricating or obtaining a circuit/processor (e.g., field programmable gate array FPGA) and connecting the circuit/processor to each of the pixels.

Each of the pixels detect one or more photons received on the pixel when a first clock signal or a second clock signal are applied to the pixels. The clock signals have a rate that is a multiple of a transmission rate of a beacon signal transmitted from a source. The first clock signal is phase shifted (e.g., by 90 degrees or other phase shift) with respect to the second clock signal, and the first and second clock signals each comprise a first time slot and a second time slot immediately after the first time slot, the first and second time slots having equal time duration. The duration is substantially similar to an average on time of the beacon signal.

The circuit/processor, for each pixel:
counts a first number of photons detected by the pixel in the first time slot of the first clock signal,
subtracts, from the first number, a second number of the photons detected by the pixel in the second time slot of the first clock signal, obtaining a first statistic U,
counts a third number of photons detected by the pixel in the first time slot of the second clock signal,
subtracts, from the third number, a fourth number of the photons detected by the pixel in the second time slot of the second clock signal, obtaining a second statistic V,
sums the number of photons detected in the first time slot of the first clock signal, the second time slot of the first clock signal, the first time slot of the second clock signal, and the second time slot of the second clock signal, obtaining a third statistic S,
determines the statistic $W=U^2+V^2-S$,
compares W for each pixel and selects the pixel having the highest W as a selected pixel, and
associates the selected pixel with one or more image pixels in an image generated by the camera, and
identifies a location of the source as being in the one or more image pixels.

Figure 25:
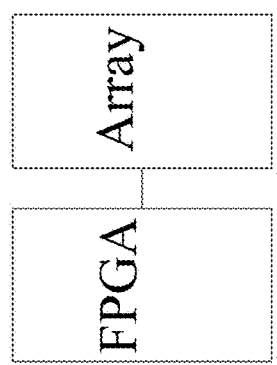
FIG. 25 illustrates a camera comprising a computer connected to an array.

FIG. 25 illustrate the end result, a camera comprising an array connected to a computer or FPGA.

Block 2404 represents connecting the camera in a free space optical communications link communicating the beacon signal between a first station comprising the camera and a second station comprising a laser transmitting the beacon signal. In one or more embodiments, the first station comprises a satellite and the second station is located on earth. In one or more embodiments, the beacon signal and the clock frequency are at different frequencies to account for the Doppler shift caused by ephemeris variance as the satellite moves. In one or more embodiments, the first station and second station are located on earth and separated by at least 20 km and the beacon signal can be detected through obscurants such as fog and cloud. The second station and/or the first station comprises a transmitter and receiver, including, but not limited to, transmitters and receivers described herein.

The optical data links described herein can transmit wavelengths including, but not limited to, optical, visible, ultraviolet, infrared, or midinfrared wavelengths. For example, the lasers in the transmitters can transmit electromagnetic radiation having a wavelength in a range from ultraviolet wavelengths up to a wavelength of 20 micrometers. The receivers can also receive and detect the electromagnetic radiation in the range from ultraviolet to midinfrared.

In one or more embodiments, the incoming transmitted signal can be spread over the pixels in the array so that each pixel can measure the number of photons that are incident. In one or more embodiments, the signal intensity is reduced such that the array can detect 0.1 photons per pulse.

Processing Environment

Figure 26:
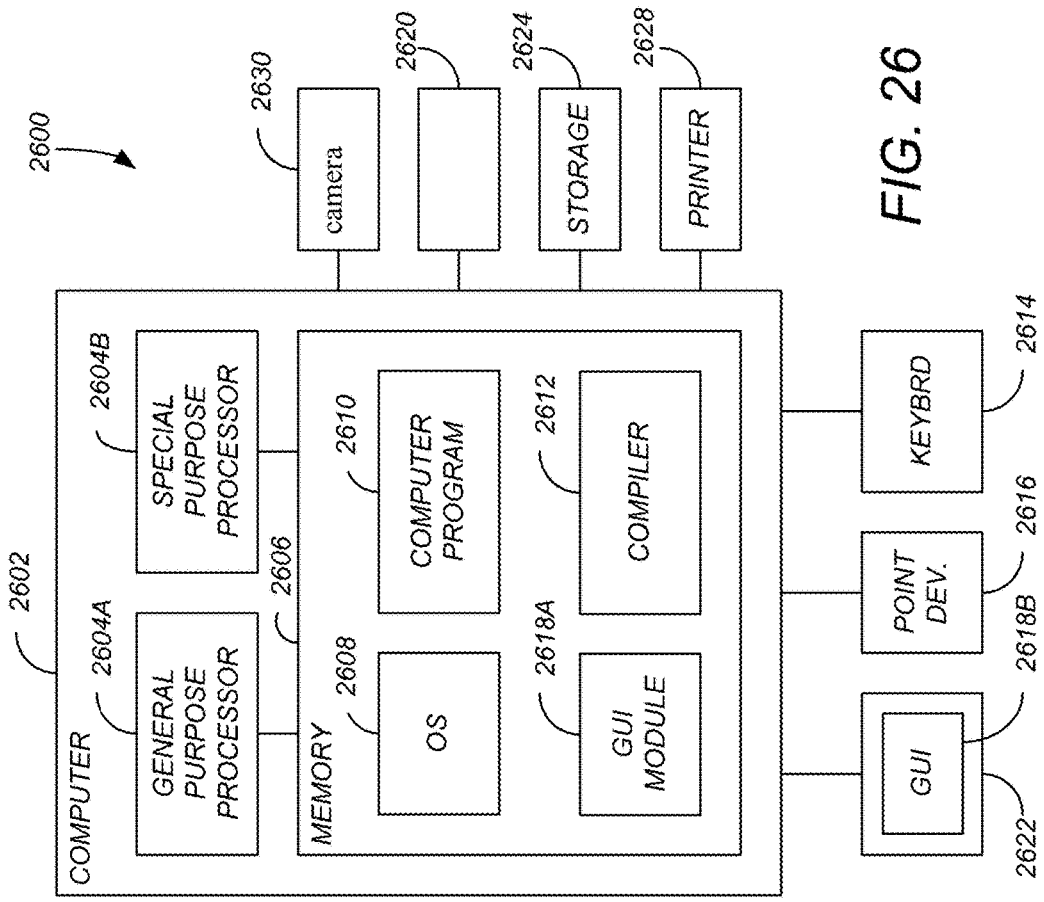
FIG. 26 illustrates a processing environment for use with one or more embodiments.

FIG. 26 illustrates a system that is coupled to the camera, transmitter, or receivers 2630 described herein, according to one or more embodiments, in order to achieve the processing/algorithm functions described herein. The computer 2602 comprises a processor 2604 and a memory, such as random access memory (RAM) 2606. In embodiments requiring a human interface, the computer 2602 is operatively coupled to a display 2622, which presents images such as windows to the user on a graphical user interface 2618B. The computer 2602 may be coupled to other devices, such as a keyboard 2614, a mouse device 2616, a printer, etc. Of course, those skilled in the art will recognize that any combination of the above components, or any number of different components, peripherals, and other devices, may be used with the computer 2602.

Generally, the computer 2602 operates under control of an operating system 2608 stored in the memory 2606, and interfaces with the user to accept inputs and commands and to present results through a graphical user interface (GUI) module 2618A. Although the GUI module 2618B is depicted as a separate module, the instructions performing the GUI functions can be resident or distributed in the operating system 2608, the computer program 2610, or implemented with special purpose memory and processors. The computer 2602 also implements a compiler 2612 which allows an application program 2610 written in a programming language such as Java, C++, C#, or other language to be translated into processor 2604 readable code. After completion, the application 2610 accesses and manipulates data stored in the memory 2606 of the computer 2602 using the relationships and logic that was generated using the compiler 2612. Analogous results can be accomplished with field programmable gate arrays (FPGAs) or other circuits. The computer 2602 also optionally comprises an external communication device such as a modem, satellite link, Ethernet card, or other device for communicating with other computers.

In one embodiment, instructions implementing the operating system 2608, the computer program 2610, and the compiler 2612 are tangibly embodied in a computer-readable medium, e.g., data storage device 2620, which could include one or more fixed or removable data storage devices, such as a zip drive, floppy disc drive 2624, hard drive, CD-ROM drive, tape drive, etc. Further, the operating system 2608 and the computer program 2610 are comprised of instructions which, when read and executed by the computer 2602, causes the computer 2602 to perform the operations herein described. Computer program 2610 and/or operating instructions may also be tangibly embodied in memory 2606, thereby making a computer program product or article of manufacture. As such, the terms "article of manufacture," "program storage device" and "computer program product" as used herein are intended to encompass a computer program accessible from any computer readable device or media.

It is understood that the foregoing embodiment of the computer system includes peripherals (e.g. display 2622, GUI module 2618A, GUI 2618, mouse device 2619, keyboard 2614, printer 2628 or compiler 2612) that may be useful in some applications but not others.

Those skilled in the art will recognize many modifications may be made to this configuration without departing from the scope of the present disclosure. For example, those skilled in the art will recognize that any combination of the above components, or any number of different components, peripherals, and other devices, may be used.

REFERENCES

The following references are incorporated by reference herein.
[1] Farr, W., Regehr, M., Wright, M., Sheldon, D., Sahasrabudhe, A., Gin, J., and Nguyen, D., "Overview and design of the DOT flight laser transceiver," in [JPL Interplanetary Network Progress Report], 42-185 (May 2011).
[2] Quirk, K. J., Gin, J., and Srinivasan, M., "Optical ppm synchronization for photon counting receivers," in [IEEE Military Communications Conference, MILCOM], 1-7 (November 2008).
[3] Farr, W., Sburlan, S., Sahasrabudhe, A., and Birnbaum, K. M., "Deep space acquisition and tracking with single photon detector arrays," in [2011 International Conference on Space Optical Systems and Applications (ICSOS)], 117-121 (May 2011).
[4] Cova, S., Ghioni, M., Lacaita, A., Samori, C., and Zappa, F., "Avalanche photodiodes and quenching circuits for single-photon detection," Appl. Opt. 35, 1956-1976 (April 1996).
[5] Itzler, M. A., Entwistle, M., Krishnamachari, U., Owens, M., Jiang, X., Slomkowski, K., and Rangwala, S., "SWIR geiger-mode apd detectors and cameras for 3d imaging," in [Proceedings SPIE], 9114 (June 2014).
[6] Frechette, J., Grossmann, P. J., Busacker, D. E., Jordy, G. J., Duerr, E. K., McIntosh, K. A., Oakley, D. C., Bailey, R. J., Ruff, A. C., Brattain, M. A., Funk, J. E., MacDonald, J. G., and Verghese, S., "Readout circuitry for continuous high-rate photon detection with arrays of inp geiger-mode avalanche photodiodes," in [Proceedings SPIE], 8375 (May 2012).
[7] Yu, D. F. and Fessler, J. A., "Mean and variance of photon counting with deadtime," in [Conference Record, 1999 IEEE Nuclear Science Symposium], 3, 1470-1474 (1999).
[8] Moision, B. and Hamkins, J., "Deep-space optical communications downlink budget: Modulation and coding," in [JPL Interplanetary Network Progress Report], 42-154 (August 2003).
[9] Powerpoint slides entitled Binary polarization-shift-keyed modulation for interplanetary CubeSat optical communications, by Michael Peng, William Farr, Michael Borden, Abhijit Biswas, and Joseph Kovalik, SPIE-Lase 2017, Jan. 30, 2017 and manuscript entitled binary polarization-shift-keyed modulation for interplanetary CubeSat optical communications, by Michael Peng, William H. Farr, Michael B. Borden, Abhijit Biswas, Joseph M. Kovalik for use in the conference proceedings for the SPIE 2017 conference.
[10] Meera Srinivasan; Kenneth S. Andrews; William H. Farr and Andre Wong "Photon counting detector array algorithms for deep space optical communications", *Proc. SPIE* 9739, Free-Space Laser Communication and Atmospheric Propagation XXVIII, 97390X (Mar. 15, 2016); doi:10.1117/12.2217971; http://dx.doi.org/10.1117/12.2217971

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A camera, comprising:
an array of imaging pixels; and
a circuit connected to each of the pixels, wherein:
 each of the pixels detect one or more photons received on the pixel when a first clock signal or a second clock signal are applied to the pixels,
 the clock signals have a rate that is a multiple of a transmission rate of a beacon signal transmitted from a source, the beacon signal comprising a signal flux, and
 the first clock signal is phase shifted with respect to the second clock signal,
 the first and second clock signals each comprise a first time slot and a second time slot immediately after the first time slot, the first and second time slots having equal time duration,
 the duration is substantially similar to an average on time of the beacon signal, and
 the circuit, for each pixel,
  counts a first number of photons detected by the pixel in the first time slot of the first clock signal,
  subtracts, from the first number, a second number of the photons detected by the pixel in the second time slot of the first clock signal, obtaining a first statistic U,
  counts a third number of photons detected by the pixel in the first time slot of the second clock signal, subtracts, from the third number, a fourth number of the photons detected by the pixel in the second time slot of the second clock signal, obtaining a second statistic V, sums the number of photons detected in the first time slot of the first clock signal, the second time slot of the first clock signal, the first time slot of the second clock signal, and the second time slot of the second clock signal, obtaining a third statistic S, determines a statistic W as a function of U, V, and S so that W is a function of the signal flux, compares W for each pixel and selects the pixel having the highest W as a selected pixel, and associates the selected pixel with one or more image pixels in an image generated by the camera, and identifies a location of the source as being in the one or more image pixels.

2. A free space optical communications link communicating the beacon signal between a first station comprising the camera of claim 1 and a second station comprising a laser transmitting the beacon signal.

3. The link of claim 2, wherein:

the first station comprises a satellite and the second station is located on earth, and the beacon signal and the clock signals are at different frequencies to account for the Doppler shift caused by ephemeris variance as the satellite moves.

4. The link of claim 2, wherein the first station and second station are located on earth and separated by at least 20 km.

5. The link of claim 2, wherein the second station comprises a transmitter, the transmitter comprising:

a polarization maintaining optical fiber having a slow axis and a fast axis;

a fiber optic coupler comprising a first coupler input, a second coupler input, and a coupler output, wherein the coupler output is coupled to the optical fiber;

a first gated laser connected to the first coupler input, wherein a first polarization axis of light emitted from the first gated laser is aligned to the slow axis;

a second laser connected to the second coupler input, wherein a second polarization axis of the second laser is aligned to the fast axis;

a circuit comprising a first input, a second input, a third input, a fourth input, a first output and a second output, wherein:

the optical fiber outputs the electromagnetic radiation having the first polarization axis representing a first binary state and emitted from the first gated laser, when the first output outputs a signal switching the first gated laser on in response to the first input receiving a clock signal and the second input receiving a data signal representing the first binary state in a data stream; and the optical fiber outputs the electromagnetic radiation having the second polarization axis representing a second binary state and emitted from the second laser, when the second output outputs a signal switching the second laser on in response to the third input receiving the clock signal and the fourth input receiving a data signal representing the second binary state in the data stream.

6. The camera of claim 1, wherein the first clock signal is phase shifted by 90 degrees with respect to the second clock signal.

7. The camera of claim 1, where $W=U^2+V^2-2S$.

8. The camera of claim 7, wherein the first clock signal is phase shifted by 90 degrees with respect to the second clock signal.

* * * * *